Sept. 22, 1964 B. V. SEIDNER 3,149,838

AUTOMATIC SPARE PRACTICE BOWLING MECHANISM

Filed Jan. 10, 1961 12 Sheets-Sheet 1

INVENTOR
BURTON V. SEIDNER
BY Eugene S. Lovette
ATTORNEY

Sept. 22, 1964 B. V. SEIDNER 3,149,838

AUTOMATIC SPARE PRACTICE BOWLING MECHANISM

Filed Jan. 10, 1961 12 Sheets-Sheet 2

INVENTOR
BURTON V. SEIDNER
BY Eugene S. Kovette
ATTORNEY

AUTOMATIC SPARE PRACTICE BOWLING MECHANISM

Filed Jan. 10, 1961 12 Sheets-Sheet 3

INVENTOR
BURTON V. SEIDNER
BY [signature]
ATTORNEY

Sept. 22, 1964 B. V. SEIDNER 3,149,838

AUTOMATIC SPARE PRACTICE BOWLING MECHANISM

Filed Jan. 10, 1961 12 Sheets-Sheet 4

INVENTOR
BURTON V. SEIDNER
BY Eugene S. Lovette
ATTORNEY

INVENTOR
BURTON V. SEIDNER
BY Eugene S. Lovette
ATTORNEY

Sept. 22, 1964 B. V. SEIDNER 3,149,838
AUTOMATIC SPARE PRACTICE BOWLING MECHANISM
Filed Jan. 10, 1961 12 Sheets-Sheet 6
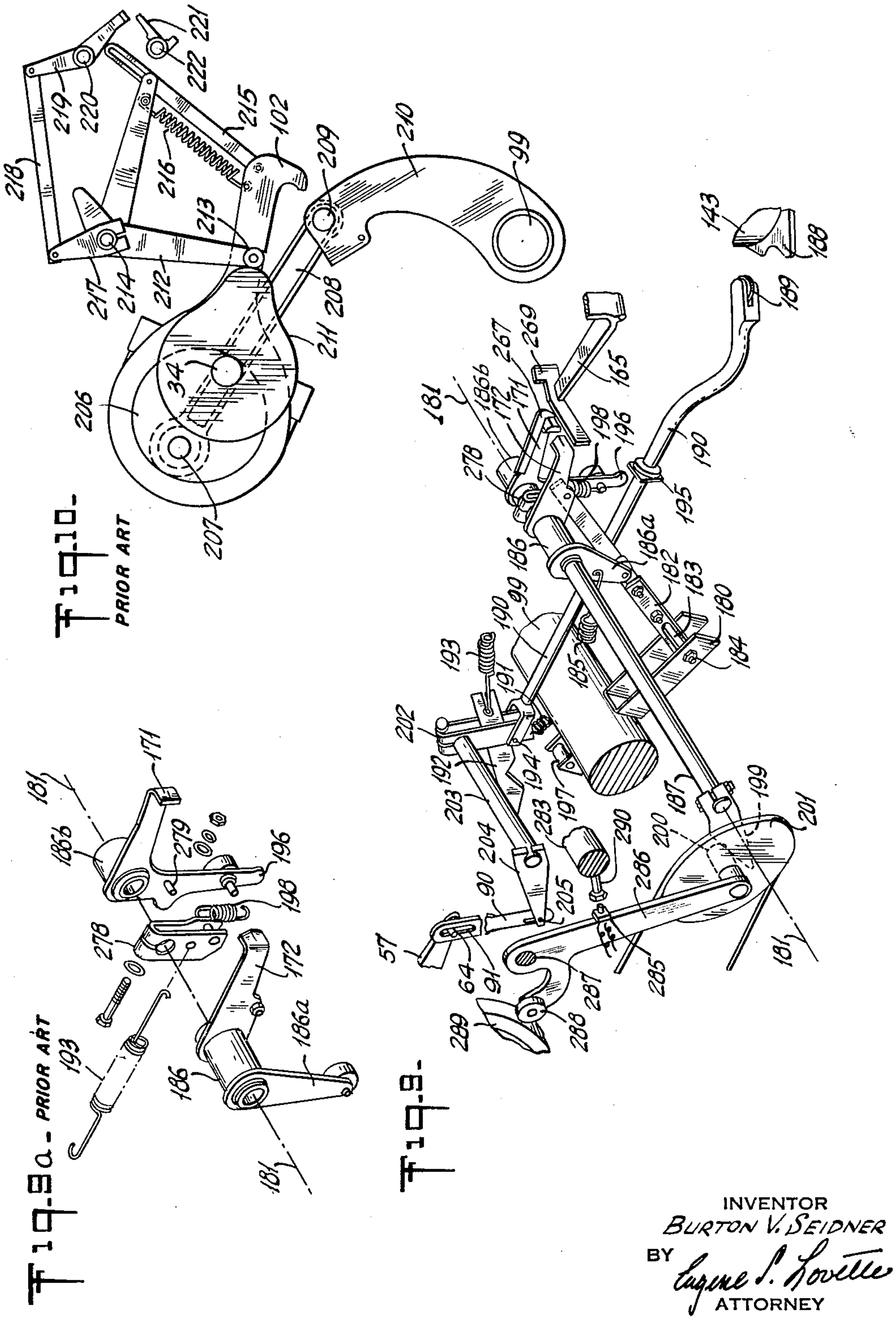
FIG. 10 - PRIOR ART, FIG. 9, FIG. 9a - PRIOR ART
INVENTOR
BURTON V. SEIDNER
BY Eugene L. Lovette
ATTORNEY Sept. 22, 1964 B. V. SEIDNER 3,149,838

AUTOMATIC SPARE PRACTICE BOWLING MECHANISM

Filed Jan. 10, 1961 12 Sheets-Sheet 7

INVENTOR
BURTON V. SEIDNER
BY Eugene S. Lovelle
ATTORNEY

INVENTOR
BURTON V. SEIDNER
BY Eugene S. Lovelle
ATTORNEY

AUTOMATIC SPARE PRACTICE BOWLING MECHANISM

Filed Jan. 10, 1961 12 Sheets-Sheet 9

INVENTOR
BURTON V. SEIDNER
BY Eugene S. Lovette
ATTORNEY

AUTOMATIC SPARE PRACTICE BOWLING MECHANISM

Filed Jan. 10, 1961 12 Sheets-Sheet 10

INVENTOR
BURTON V. SEIDNER
BY Eugene S. Lovette
ATTORNEY

Sept. 22, 1964 B. V. SEIDNER 3,149,838

AUTOMATIC SPARE PRACTICE BOWLING MECHANISM

Filed Jan. 10, 1961 12 Sheets-Sheet 11

INVENTOR
BURTON V. SEIDNER
BY Eugene S. Lovette
ATTORNEY

AUTOMATIC SPARE PRACTICE BOWLING MECHANISM

Filed Jan. 10, 1961 12 Sheets-Sheet 12

INVENTOR
BURTON V. SEIDNER
BY Eugene S. Lovette
ATTORNEY

United States Patent Office 3,149,838

Patented Sept. 22, 1964

3,149,838
AUTOMATIC SPARE PRACTICE BOWLING MECHANISM

Burton V. Seidner, Great River, N.Y., assignor to Brunswick Corporation, Chicago, Ill., a corporation of Delaware Filed Jan. 10, 1961, Ser. No. 81,856
36 Claims. (Cl. 273—43)

This invention relates to automatic pinsetter apparatus designed to set ten tenpins on a bowling alley floor so that a bowler may play the customary tenpin bowling game.

The well known automatic pinsetter currently in use is made by The Brunswick Balke Collender Company of Chicago, Illinois. This apparatus is adapted to set automatically ten tenpins on a bowling alley floor against which a bowler plays his game. Automatic operation of the pinsetter also contemplates removal of "dead wood" after the first ball is thrown, at which time the pinsetter is holding the spare wood missed by the first ball. The apparatus automatically respots the spare pins for second ball throw. This machine also involves other phases of automatic pinsetter operation, such as setting a new set of tenpins after a strike throw.

With the growing popularity of bowling as a game, more persons are finding it desirable to practice against one or combinations of two or more tenpins constituting spare "wood" and, in particular, those spare combinations of spares that prove to be difficult to the individual bowler. For such spare practice, each bowler may wish to practice against different combinations of spare wood. At present, spare practice can be achieved by having a pin boy setting up the spare wood. Hence, it would be desirous if the foregoing apparatus, in addition to its normal cycle of operation, is also capable of setting one or more combinations of spare standing pins against which a person can practice. Consequently, the instant invention contemplates certain modifications to the current automatic pinsetter apparatus, such that, in addition to its normal operation, it will also be capable of setting any combination of one to ten tenpins so that a bowler may practice against any desired combination of spare standing wood. The invention is designed so that the machine will continue to provide such desired combination of spare tenpins until the machine is actuated to provide a different combination of spare tenpins or, if desired, the machine returns to normal operation of setting ten tenpins on the floor for the bowling game.

As a further advantage of the instant invention, the modifications contemplated herein for allowing a machine to provide spare play practice involves certain structural and electrical changes to the pinsetter which may be readily incorporated into the standard automatic pinsetter currently in use as well as those to be made in the future. In addition, the invention is of such character that it will permit the bowling alley operator or player to actuate operation of the machine incorporating the invention so that it can easily convert from normal play operation to spare play operation or vice versa.

It is, therefore, the principal object of the instant invention to provide means for modifying the standard automatic pinsetter wherein said apparatus will provide whenever desired normal bowling play operation or spare practice operation wherein the latter contemplates setting of any desired combination of one to ten tenpins and whereby conversion from one operation to the other is readily achieved. Automatic spare practice is accomplished by causing selected ones of the turret baskets to by-pass or index past the pin feeding conveyor without the feed of a tenpin to these selected baskets and by actuating spider release with or without a No. 5 tenpin being fed to the turret chute depending whether a No. 5 tenpin is called for in the combination constituting spare play practice. In one embodiment of the invention, removable blocks are inserted into the turret indexing cam dwells wherein each blocked dwell is by-passed during turret indexing. The empty dwells actuate the turret indexing mechanism in accordance with existing operation so that baskets corresponding to the empty dwells receive tenpins and baskets corresponding to the blocked dwells are not fed tenpins. A spider release solenoid has a linked operator which is adapted to engage the turret probe triggering device for actuating spider release without a No. 5 tenpin falling into the turret chute. The feed of the No. 5 tenpin to the chute is prevented when such result is desired by another operator linked to a pin gate solenoid which overrides certain of the turret indexing mechanism, and in particular, the pin gate latch link to prevent the No. 5 tenpin falling into the chute when the spare practice combination does not call for such tenpin. When a No. 5 tenpin is called for, the foregoing solenoids are deactuated wherein spider release operation is in accordance with the existing operation of the pinsetter.

The second embodiment of the invention omits the use of dwell blocks and extends the use of the pin gate solenoid and its linked operator to regulate the feed of tenpins to the turret baskets as well as to the turret chute. In this embodiment, a rotary switch responsive to turret turning is designed to control the pin gate solenoid whereby tenpins are fed to selected ones of the turret baskets and to the turret chute to constitute the desired spare practice play. This embodiment involves the addition of a solenoid operated index tripper responsive to the rotary switch for triggering the turret indexing mechanism to effect turret turning from one dwell to the next whenever a tenpin is not fed to a turret basket. Consequently. the pin gate solenoid and the latter indexing trigger solenoid are operationally correlated. In this embodiment, spider release operation may be substantially the same as that contemplated for the first embodiment, except that the spider release solenoid may be actuated by the rotary switch.

Further objects and advantages will become apparent from the following description of the invention taken in conjunction with the figures, in which:

FIG. 9 is a diagrammatic perspective illustration of the pinsetter apparatus interlock system and also illustrates the moving deck switch and a portion of the spider release link in accordance with the principles of the invention; FIG. 9A is an exploded view of certain portions of the apparatus interlock system to illustrate parts partially obscured in FIG. 9;

FIG. 10 is a diagrammatic plane view of the deck raising and lowering mechanism of said apparatus;

FIG. 13 is a diagrammatic plane illustration of the strike selector mechanism at 90° standing pin, whereas FIG. 14 illustrates same for 90° strike detection;

FIG. 14A illustrates diagrammatically the inclusion of a spacer between the abutting faces of the strike controller and strike selector in accordance with the principles of the invention;

FIG. 17 illustrates the circuit of the pin gate solenoid and FIGS. 18 to 21 illustrate alternative circuits for operating the spider release solenoid;

FIG. 24 is a diagrammatic illustration in perspective of the split link spider release actuating device wherein the various elements thereof are shown displaced for the purpose of clearness, whereas FIG. 24A is a top plane view of same for illustrating a more realistic space relationship of the elements thereof;

FIGS. 1, 2, 2A, 5, 6, 7, 9A, 10–14 and 25 depict prior art and are illustrated herein to assist in the understanding of the invention.

It will be understood that many of the operatively associated parts shown in these figures are illustrated in displaced relationship and not in exact spaced relationship with respect to each other to avoid obscuring such component parts and to further the clearness of the description of the pinsetter apparatus and the inventions described herein.

Reference is now made to the figures for a description of the mode of operation and structure of an automatic bowling pinsetter 30 of the type currently employed in numerous bowling alleys. It is the purpose of this invention to modify pinsetter 30 in accordance with the improvements claimed herein to achieve the foregoing described objects. Since the structure of pinsetter 30 and its mode of operation are well known to many persons skilled in the art, the following description and the illustrations shown herein will be brief and schematic, respectively, merely to provide desirable background information for an understanding of the improvements claimed herein. For a complete discussion and illustration of pinsetter 30, reference should be made to publications such as the Brunswick Automatic Pinsetter Service Manual, revised October 1957 and published by the Brunswick-Balke-Collender Co., Automatic Pinsetter Installation and Service Department, 495 Route 17, Paramus, New Jersey; the Brunswick Automatic Pinsetter Detector Manual and the Brunswick Automatic Pinsetter Parts Catalog also published by the aforesaid company.

Figure 1:
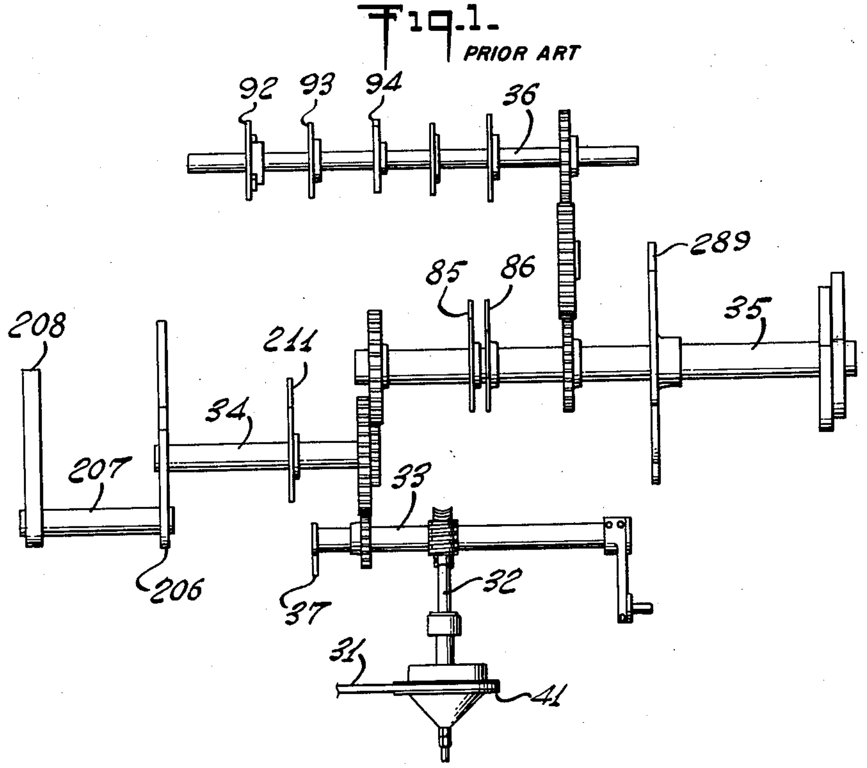
Fig. 1. PRIOR ART
FIG. 1 is a diagrammatic plane view illustrating the gear drive of the pinsetter apparatus.

When pinsetter 30 is turned on for operation it is powered by an electric motor through a combination of sheaves and belts. A drive belt 31 from the electric motor drives the pulley assembly shown in FIG. 1, which assembly includes a friction clutch mechanism to impart input turning power to an input drive shaft 32. By means of a simple gear train depicted in FIG. 1, input shaft 32 drives four shafts 33 to 36 on which are mounted cams that control pinsetter operation. The shafts involve a 4 to 1 ratio shaft 33, a 2 to 1 shaft 34, and a pair of 1 to 1 shafts 35, 36. Complete pinsetter cycle is considered to be 360° or one complete revolution of the 1 to 1 shafts. A cam 37 is mounted on 4 to 1 shaft 33 which can stop pinsetter operation four times in one cycle, to wit: 90, 180, 270 and 360 degrees. A deck lift hook assembly is mounted on 2 to 1 shaft 34 which serves to raise and lower the pinsetter deck twice in one cycle. The deck is raised and lowered once to detect and once again to respot standing or new pins. Various cams are located on 1 to 1 shafts 35, 36 to control operations that occur only once per cycle.

Engagement and disengagement of the friction clutch mechanism effects start and stop of pinsetter operation. The mechanism includes a clutch drive disc 38 and a clutch drive disc assembly 39, which engage splines on an input power worm shaft 40. Shaft 40 is an extension of drive shaft 32. A pulley 41 is driven by belt 31 from the power motor. Pulley has faces of friction material adapted to engage discs 38, 39. Pulley 41 is free to run on a bearing on the hub of clutch drive disc assembly 39. A compression spring 42 is backed up on shaft 40 by a spring retainer 43 and urges disc assembly 39 to the left; and unless restrained, spring 42 forces discs 38, 39 and pulley 41 together thereby engaging the clutch to turn shafts 32, 40.

Figure 2A:
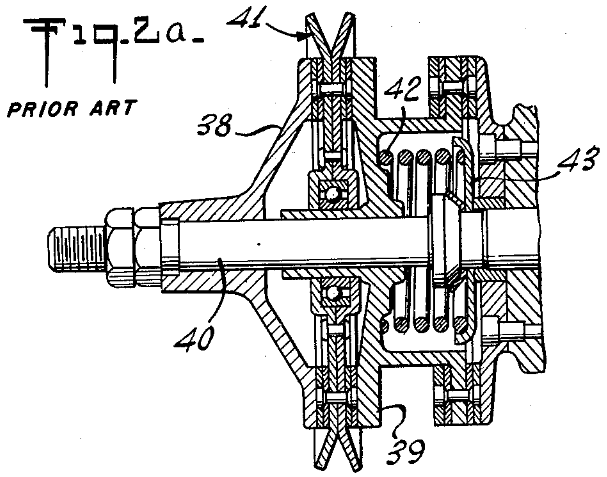
Fig. 2a. PRIOR ART
FIG. 2A is a plane view in section of the drive gear clutch mechanism of said apparatus.
Figure 2:
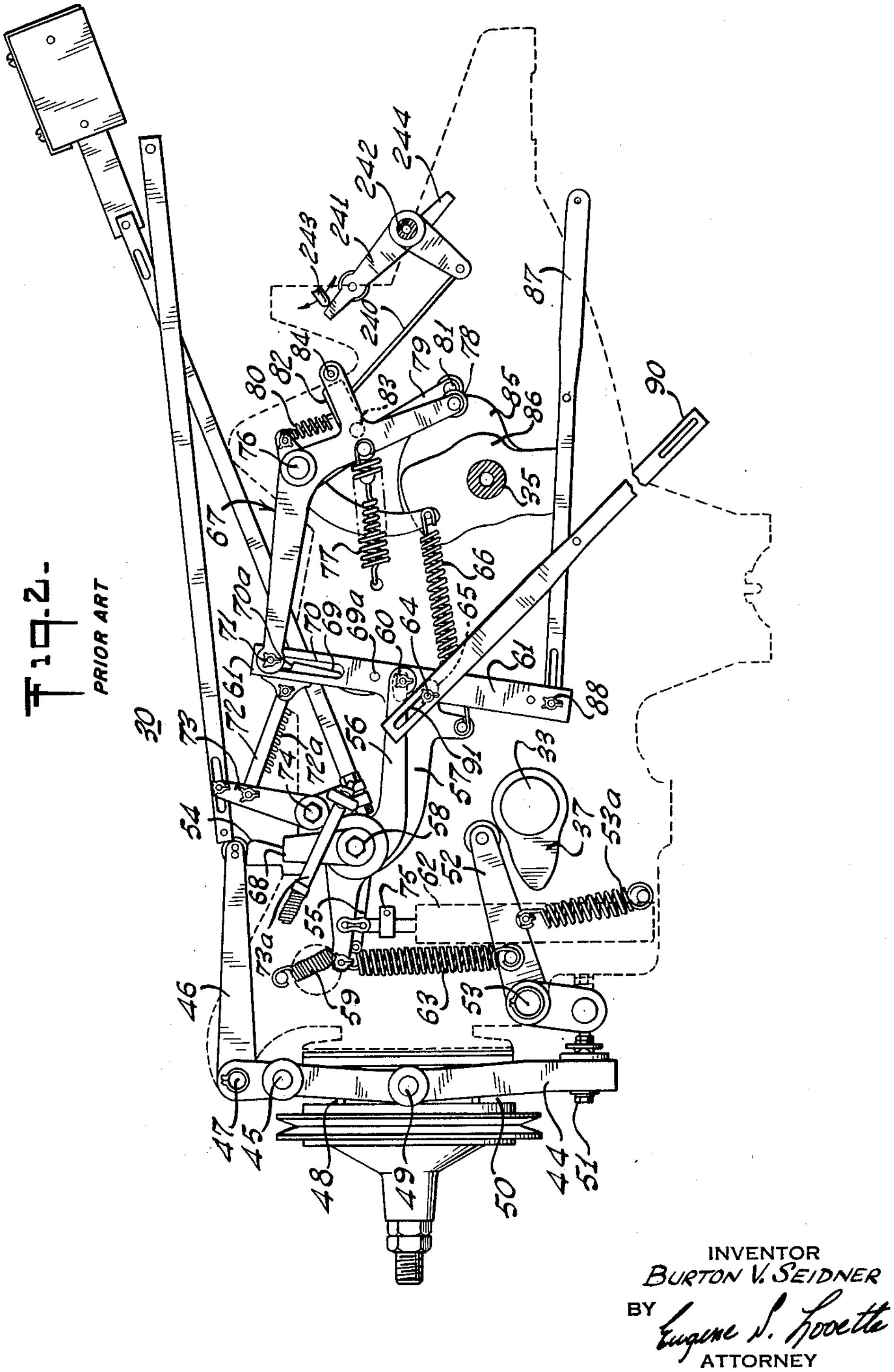
FIG. 2. PRIOR ART
FIG. 2 illustrates diagrammatically the start and stop regulating mechanism of said apparatus.

The clutch mechanism is disengaged through a V-shaped yoke assembly 44 which straddles clutch drive disc assembly 39, FIG. 2. Yoke 44 is hinged at its top 45 to turn one arm of a two arm clutch lever 46. Clutch lever 46 is pivotal at 47. A pair of clutch shoes 48 (only one shown herein) are provided about mid-way down on yoke assembly 44. Shoes 48 are pivoted on the yoke arms at 49 and ride in a groove 50 of clutch drive disc assembly 39. Yoke assembly 44 is connected at its bottom through an adjustable link and spring 51 to an arm of a two arm clutch cam follower lever 52. Lever 52 is pivoted at 53, and spring urged against cam 37 by a spring 53*a*. The action of lever 52 is controlled by its cam follower riding cam 37, which is mounted on 4 to 1 shaft 33. As cam 37 rotates, its lobe will raise clutch cam follower lever 52 four times for every cycle of operation, that is to say, four times during each 360° of pinsetter operation. The arrangement is such that this movement will disengage clutch mechanism 38–39 at 90, 180, 270 and 360 degrees if desired. A stop arm 54 on a pivotal clutch actuator lever 55 is adapted to move under the forward and free end of clutch lever 46 at 90, 180, 270 and 360 degrees.

When stop arm 54 is under the free end of lever 46, clutch mechanism 38–39 will disengage as the lobe of clutch cam 37 raises clutch cam follower lever 52. When stop arm 54 is in its rear or counterclockwise, CCW, position and thus not under clutch lever 46, clutch mechanism 38–39 will not disengage when the lobe of clutch cam 37 rotates clutch cam follower lever 52.

As the rising slope of clutch cam 37 oscillates clutch cam follower lever 52, lever 52 moves the lower end of yoke assembly 44 forward or to the right as viewed in FIG. 2. If stop arm 54 is not under the free end of clutch lever 46, forward motion of the bottom of yoke assembly 44 will have no effect because the top of yoke assembly 44 will move to the rear or to the left thereby causing yoke assembly 44 to pivot on clutch shoes 48, whereby shoes 48 will continue to ride in clutch drive disc assembly groove 50 without disengaging the clutch mechanism 38–39. Lever 46 is free to turn clockwise, CW, about 47 when the top yoke assembly pivot point 45 moves to the left (rearward), because stop arm 54 is not in position to prevent such turning. Under these conditions, pinsetter operation does not stop.

On the other hand, top pivot point 45 of yoke assembly 44 becomes fixed in space when stop arm 54 is positioned under the free end of clutch lever 46 as shown in FIG. 2. In this situation, the entire yoke assembly 44 will pivot at the top about 45 as the bottom of yoke assembly 44 moves forward. As the bottom of yoke assembly 44 progresses further forward, the sides of clutch shoes 48 contact a friction surface in groove 50 and force clutch drive disc assembly 39 forward until it actually loses contact with drive pulley 41. When the pressure is released between the clutch discs, drive pulley 41 is free to run on its bearing without driving the worm shaft 40 and input power shaft 32.

One complete cycle of pinsetter operation is considered to be 360°. Pinsetter 30 is adapted to stop at 90°, i.e., one-quarter cycle of its operation; one-half cycle of its operation at 180°; three-quarters cycle of its operation at 270°; and upon completion of its full cycle of operation at 360° or zero degree. With ten tenpins on the alley floor and with pinsetter 30 energized and at zero degree or start position, the machine is ready for automatic operation when a bowler rolls his ball. Pinsetter 30 is triggered into automatic operation when the rolled ball hits a triggering device, the pit cushion, in the rear of the machine. There are two large vertically mounted wheels at the rear of pinsetter 30 which turn in opposite directions. One wheel is the ball elevator which picks up the ball and places it on a ball return track, whereby the ball returns to the bowler. The other wheel is the pin elevator which picks up the tenpins in the pit at the rear of the pinsetter. Pin elevator raises the tenpins and deposits them in a turnaround pan, which pan releases the tenpins to a cross conveyor one at a time and base first. The cross conveyor includes two parallel running belts. The belts carry the tenpins in single file fashion across the top of the pinsetter and deposits the individual tenpins one at a time into the individual baskets of a pinsetter turret. The pinsetter turret stores the tenpins until it has ten and then deposits the ten tenpins into the pinsetter deck. The pinsetter deck is the device that stores the ten tenpins and when necessary lowers and sets the tenpins in the triangular array on the pin deck of the alley.

If the bowler does not knock down all the tenpins with his first ball, the dead wood is removed before a second ball is delivered. This operation is accomplished by the detection action of the deck and a rake. The deck lifts the standing tenpins up from the alley and the rake sweeps the dead wood into the rear pit. The deck then respots the tenpins in their original positions for second ball play. Detection action occurs at 90° (first ball) of the pinsetter cycle of operation at which time its deck is in a lowered position to detect whether there are standing pins or not. At 180° of pinsetter cycle of operation, the deck will have returned to its up position and the rake sweeps the dead wood into the pit. If the deck does not find standing pins during retection, the deck will lower again and set ten new tenpins on the alley floor at 270° of operation and then return to its up position at 360° for the next ball play. On the other hand, if at 90° the deck detects standing pins, the deck (by means of its scissor operators) will take hold of the standing pins and raise same to permit the rake to sweep the dead wood into the pit at 180° of operation. At 270° of operation, the deck returns down to respot the standing pins. At 360° of operation, the deck and rake are in up position. However, in the instance of second ball play, the pinsetter is arranged to cycle an additional 90° since there will be no need for the pinsetter to detect after delivery of a second ball. This extra 90° override (or overtravel) is an idle motion because the deck and rake are held up while the pinsetter goes through what otherwise would be detecting action at 90°. The override is utilized to speed up the game as the bowler now will not have to wait for a second ball detecting cycle before the deck sets ten new tenpins for the next first ball play.

On second ball, the pinsetter starts its operation at 90°. The deck at 90° is held up by a holding hook and remains up as the rake is sweeping dead wood at 180°. At 270°, the deck comes down and set ten new tenpins. At 360°, the deck is up and so is the rake and the alley is ready for the next ball.

There are certain positions during normal pinsetter operation which involves stopping and restarting the machine. Pinsetter 30 is required to start with its "stop and restart" control levers in position at 360° (or 0°) so that ball impact causes the clutch mechanism 38–39 to engage at the end of a strike cycle or second ball cycle, and also at the end of a standing pin cycle which involves the override to 90°. In addition, the pinsetter may have to stop at 180° when its deck is up and before coming down to set pins at 270° if for any reason the deck does not have ten tenpins to deliver to the alley. In this latter instance, the pinsetter has to restart without ball impact after its turret receives its tenth tenpin. Consequently, the latter phase of operation requires a start trigger signal independent of ball impact.

The "stop-start" control levers include the two arm clutch actuator lever 55, a two arm plunger lever 56 and a two arm clutch release lever 57. These three levers are turnable about the same shaft 58, but each are free to rotate independently of the other. One arm of clutch actuator lever 55 is the upright stop arm 54 which can move under clutch lever 46 to disengage clutch mechanism 38–39. Clutch actuator lever 55 is continuously spring urged by a spring 59 in a clockwise direction so that its stop arm 54 is constantly urged CW or forward into its stop position. One arm of plunger lever 56 is pinned at its end 60 to a closed slot in a clutch actuator link 61. The other arm of plunger lever 56 is connected to a plunger of a dashpot 62 which can be adjusted to regulate the speed at which plunger lever 56 can rotate. Plunger lever 56 is continuously spring urged in a counterclockwise direction by a spring 63. Clutch release lever 57 carries a pin 64 at the end of one arm, which pin rides in an open slot 65 in clutch actuator link 61. Lever 57 is also connected by a spring 66 in tension to an arm of a multi-arm clutch reset lever assembly 67. The other arm of clutch release lever 57 includes an upright projection 68 which is adapted to contact stop arm 54 to move same counterclockwise or backwards out from under clutch lever 46 thereby allowing clutch mechanism 38–39 to engage to start pinsetter through its cycle of operation.

With ten tenpins on the alley floor and pinsetter 30 stopped at zero degree position in preparation for automatic operation, the following conditions exist. The "stop-start" triggering device is latched to hold pinsetter 30 in stop condition. This means that clutch mechanism 38–39 is disengaged, because stop arm 54 is in its forward or CW position. Tension spring 66 extending between clutch reset lever assembly 67 and clutch release lever 57 and spring 63 acting on plunger lever 56 are urging levers 56, 57 counterclockwise. At the same time, pin 64 in open slot 65 of clutch actuator link 61 and pin 60 in the closed slot of actuator link 61 are urging this link 61 upward. Levers 56, 57 are prevented from turning counterclockwise and actuator link 61 is prevented against rising by a clutch latch 69 when latch 69 is hooked under a pin 71 on an arm of reset lever assembly 67. Latch 69 is pivotally pinned at *69a* to actuator link 61. Latch 69 has a shoulder *71a*, which shoulder is adapted to hook under pin 71. Pin 71 rides in a closed slot 70, which slot is at the top of actuator link 61. Clutch latch 69 is continuously spring-urged in a forward or latching direction clockwise around its pivot *69a*. When latch 69 is in such forward position and its shoulder *71a* is hooked by pin 71, actuator link 61 is held against rising at zero degree and 90° overtravel. Just prior to zero degree and 90° overtravel, pin 71 will have raised above shoulder *71a* to hook same by reason of the action of reset lever assembly 67; this action will be described hereinafter. At zero degree and 90° overtravel, pin 71 depresses latch 69 and the connected link 61 down to "stop" position, whereby clutch mechanism 38–39 disengages through release lever 57. Hence, it is understood that the latched actuator link 61 keeps stop arm 54 in its forward or "stopped" position.

Clutch latch 69 is attached through a short connection 72 to a starter bell-crank lever 73. A spring *72a* from lever 73 to a stationary reference urges latch 69 in its forward direction. When a bowler rolls his ball against the standing tenpins, the ball will strike some or all of the pins or the ball will miss the pins. The rolled ball then proceeds to the rear of the pinsetter to strike the pit cushion (not shown). When the ball strikes the pit cushion, the cushion swings slightly to the rear to actuate a trip rod *73a* which in turn rotates bell-crank lever 73 counterclockwise on its pivot 74 as seen in FIG. 2. Through the interconnecting short connection 72, this motion pulls clutch latch 69 out from under clutch reset lever pin 71. With link 61 now unlatched, clutch release lever 57 and plunger lever 56, both being spring-urged CCW, rotate counterclockwise and raise clutch actuator link 61 upward. This motion also permits projection 68 on clutch release lever 57 to push stop arm 54 CCW out from under clutch lever 46 thereby resulting in engagement of clutch mechanism 38–39 to start operation of pinsetter 30. Clutch actuator link 61 will come to rest with the reset lever pin 71 riding in the bottom of slot 70. Link 61 rises until stopped by a plunger lever stop 75 which contacts the top of dashpot 62 to prevent further movement.

Clutch reset lever assembly 67 is continuously urged clockwise about its pivot 76 by spring units 77. An arm of assembly 67 carries an outer cam follower 78. Another arm 79 of assembly 67 is also urged clockwise about pivot 76 by one of the springs 77. The lower end of arm 79 carries an inner cam follower 81. Arm 79 also carries a selector latch 82 pivotal about 83. Selector latch 82 is spring urged CCW about 83 by a spring 80 and is controlled by a detector assembly in a manner to be described hereinafter, whereby latch 82 can be moved in and out of engagement with a roller 84 on an outer arm of the clutch reset lever assembly 67 to enable the pinsetter to stop either at 360° or 90°. When selector latch 82 is turned clockwise to engage reset lever roller 84, clutch reset lever assembly 67 is controlled by inner cam follower 81 riding on its extended cycle inner cam 85. As inner cam follower 81 reaches the low point of its cam 85, clutch reset lever assembly 67 is at its furthest clockwise position, whereby its pin 71 in clutch actuator link slot 70 is raised high enough for clutch latch 69 to snap back into its latch position under pin 71. Consequently, when a rising slope of cam 85 rotates clutch reset lever assembly 67 counterclockwise thus pushing actuator link 61 down, clutch release lever 57 and plunger lever 56 rotate clockwise. This frees clutch actuator lever 55 to rotate in its spring urged clockwise direction to bring stop arm 54 under clutch lever 46, whereby clutch mechanism 38–39 disengages at 360°. When selector latch 82 is turned counterclockwise and thus disengaged with respect to reset lever roller 84, reset lever assembly 67 is regulated by outer cam follower 78 engaging its extended cycle outer cam 86. Inner and outer cams turn with shaft 35. As outer cam follower 78 reaches a low point on its outer cam 86, clutch reset lever assembly 67 is in its furthest clockwise position and clutch latch 69 snaps in latched position under pin 71 and as outer cam follower 78 contacts a rising surface in its cam 86, clutch lever assembly 67 rotates counterclockwise thereby pushing clutch actuator link 61 down to rotate clutch release lever 57 and plunger lever 56 clockwise. This frees clutch actuator lever 55 to rotate in its spring urged clockwise rotation, whereby stop arm 54 moves under clutch lever 46 whereby clutch mechanism 38–39 will disengage at 90°. It will be understood that the rising surface of outer extended cycle cam 86 occurs 90° after or later than the rising surface of inner extended cycle cam 85, or in other words, downward motion of clutch actuator link 61 occurs 90° later when outer cam 86 is in control to permit the pinsetter to cycle an extra 90° in its operation.

If the pinsetter deck for any reason does not have ten tenpins to deliver to the alley at 180°, clutch mechanism 38–39 must disengage without clutch latch 69 being under pin 71 so that clutch mechanism 38–39 can re-engage without a ball impact when the turret delivers ten tenpins to the pinsetter deck. As pinsetter 30 cycles towards 180° position of its phase of operation, clutch reset lever assembly 67 follows the down slope of either cam 85, 86 which turns reset lever assembly 67 clockwise about pivot 76 to eliminate the pull on spring 66 connecting reset lever assembly 67 with clutch release lever 57. Clutch reset lever assembly 67 now rides an extended low dwell on either cam. Although the dwell is low enough to eliminate pull on spring 66, it is not low enough to rotate clutch reset lever 67 far enough clockwise to permit clutch latch 69 to snap into latch position under pin 71. At this point, a pin detector link 87, which is pinned at 88 to the lower end of link 61, is pulled by the detector assembly to the right. Link 87 has a slot for the pin 88 connection with link 61. This motion causes clutch release lever pin 64 to drop out of open slot 65 in actuator link 61 which frees clutch actuator lever 55 to rotate in its spring urged clockwise direction to bring its stop arm 54 under clutch lever 46 to disengage clutch mechanism 38–39 at 180°. The foregoing action will stop pinsetter operation at 180° of its phase of operation to wait for the delivery of tenpins to the turret. Since clutch mechanism 38–39 is disengaged without clutch latch 69 being in latched position, operation can be restarted without ball impact.

The 180° "stop" operation must be selective so as to disengage clutch mechanism 38–39 if the pinsetter deck does not have ten tenpins to release the alley, and, on the other hand, it must be operative so as not to disengage clutch mechanism 38–39 if the pinsetter deck has ten tenpins at 180° of its cycle of operation. This is brought about as follows. A turret interlock link 90 has a long slot 91 at its top end which is engaged by clutch release lever pin 64, which pin normally rides in open slot 65 of clutch actuator link 61. Actuation of turret interlock link 90 will be described hereinafter. However, it will be understood that when the pinsetter deck has ten tenpins at 180°, turret interlock link 90 will be held in an upward position. Consequently, as clutch actuator link 61 swings to the right and pin 64 drops out of open slot 65, pin 64 is positively engaged by the bottom of turret interlock link slot 91. This will forceably prevent clockwise turning of clutch actuor lever 55 and its stop arm 54 in its spring urged direction to its stop position, whereby clutch mechanism 38–39 will not disengage. On the other hand, if the pinsetter deck does not have ten tenpins at 180°, as clutch actuator link 61 swings to the right to pull pin 64 free of slot 65, interlock link 90 for this condition will not be held in an upward position, but will be in a neutral downward position. The weight of the freed lever 57 will swing it clockwise and its pin 64 will be free to move in interlock link slot 91. This will allow the spring urged clutch actuator lever stop arm 54 to move into its stop position under clutch lever 46 to disengage clutch mechanism 38–39 at 180°. After the turret receives the tenth tenpin, interlock link 90 will be actuated in an upward direction and through clutch release lever 57 will rotate stop arm 54 out from under clutch lever 46, whereby clutch mechanism 38–39 is then re-engaged without ball impact.

Figures 3, 3A, 4, 4A:
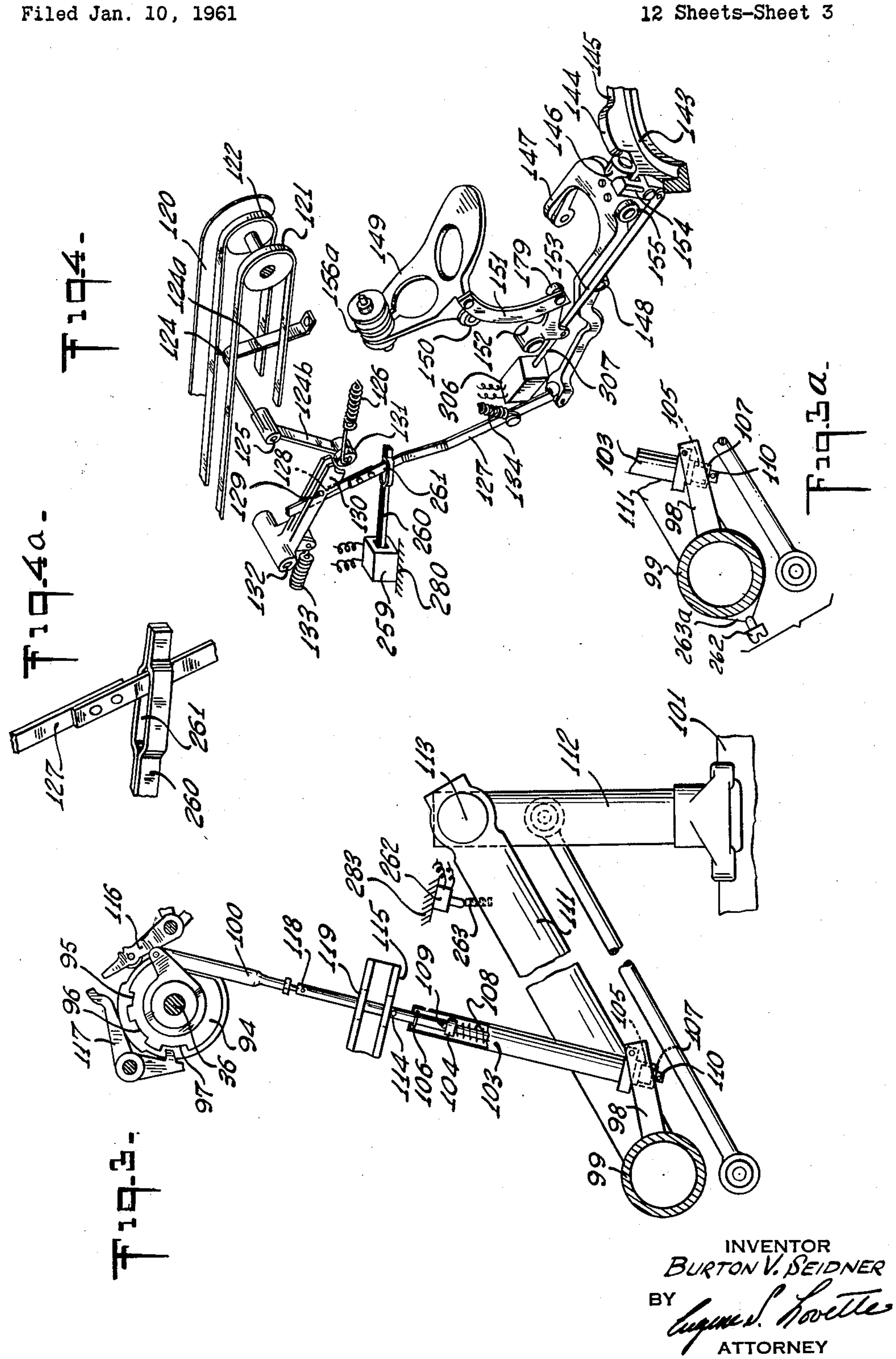
FIG. 3 illustrates diagrammatically, partly in section and cut-away, the detector disc and rod mechanism of said apparatus and also illustrates an embodiment of the "deck-up" switch added thereto in accordance with the principles of the invention.
FIG. 3A illustrates diagrammatically a fragmentary portion of FIG. 3 in order to show an alternative embodiment of the "deck-up" switch mechanism.
FIG. 4 is a diagrammatic illustration in perspective of the turret indexing mechanism of said apparatus and also illustrates the pin gate solenoid and the indexing trip lever solenoid added thereto in accordance with the principles of the invention.
FIG. 4A is an enlarged fragmentary perspective view of the pin gate link shown in FIG. 4.

The detector assembly is shown schematically in FIG. 3 and serves to store up knowledge and direct operation of pinsetter in handling any of the different situations that are set up by the delivery of a bowling ball. Four cams are mounted on and keyed to 1 to 1 shaft 36 of detector assembly. Two cams, a timer cam 92 and a selector cam 93, are on one side of a detector disc 94; the other two cams of the four are on the other side of detector disc 94. Detector disc 94 is mounted on shaft 36 to turn freely thereon, whereas the four cams mounted on shaft 36 are keyed thereto to turn with shaft 36. Detector disc 94 has spaced cut-outs, such as 95, 96, 97, along its outer perimeter. Disc 94 is connected to an arm 98 of a deck lift shaft 99 by a detector rod 100, whereby disc 94 will rotate with rotation of deck lift shaft 99 so that for every position of pinsetter deck (shown in part as 101 in FIG. 3) in its up and down positions, there is a correpsonding position for detector disc 94. In this manner, cut-outs 95 to 97 on disc 94 are brought into proper operative position to allow cam followers and other latching mechanisms associated with the four cams to operate. FIG. 3 illustrates a typical cam follower 116 and typical blocking latch mechanism 117 for one of the cams.

Figure 10A:
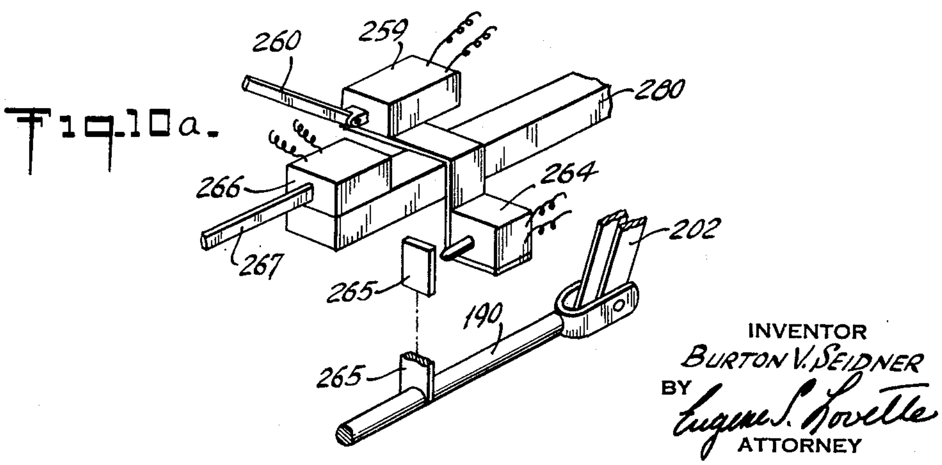
FIG. 10A is a diagrammatic illustration in perspective of the mounting of the pin gate solenoid, the spider release solenoid and the interlock long link switch to the pinsetter apparatus.

When deck 101 lowers to detect after first ball impact, deck 101 will be supported by the tenpins, if any are still standing. This positions detector disc 94 to allow "first ball-standing pins" cam followers and latches to function. If there are no standing pins, because a strike was rolled, deck 101 will lower to the full extent allowed by a deck lowering hook 102 (see FIG. 10). This positions disc 94 differently then for standing pin operation, whereby the strike cam followers and latches control pinsetter operation. At its lower end, detector rod 100 has a hollow tube 103 pivoted to arm 98, which arm turns with deck lift shaft 99. A pair of spaced bearings 104, 105 are free to slide on the rod portion inside tube 103 between upper and lower retaining rings 106, 107. Bearings 104, 105 are normally urged apart by a spring 108 against spaced pins 109, 110 at the top and bottom of tube 103. The top of rod 100 is pivoted to an extension of detection disc 94. A main upper deck arm means 111 extends from deck lift shaft 99 and supports deck support arm means 112 at pivot 113. As deck lift shaft 99 rotates upward, rod 100 through lower ring 107, bearings 104, 105 and lower pin 110 moves up until a stop pin 114 is physically halted by hitting an exposed stop 115 on a gear box support. Any further rotation of deck lift shaft 99 merely compresses spring 108 in tube 103 without moving rod 100 and detector disc 94. In the same manner as deck lift shaft 99 rotates downward, rod 100 through upper ring 106, bearings 104, 105 and pin 109 will come down until another stop pin 118 on the exposed part of rod 100 is halted by stop 119 or the gear box support. Any further rotation of deck lift shaft 99 merely compresses spring 108 without further movement of rod 100 or disc 94.

When the tenpins are raised by the pin elevator and released to the turnabout pan, this pan feeds each tenpin one at a time and butt first to a cross conveyor 120. Cross conveyor 120 (FIG. 4) includes among other things, a pair of running belts 121, 122 which carry the tenpins in single file fashion to the forward end of the conveyor for dropping the tenpins into a deck turret 123. As the tenpin is carried forward by conveyor 120, it actuates a two-arm pivotal pin gate 124 by striking the upper arm 124*a* thereof which projects upright between belts 121, 122. This action as will be seen hereinafter locks pin gate 124 to prevent delivery of a subsequent tenpin to turret 123 until the curret has indexed to its next position after receiving the first tenpin in an individual turret basket. Accordingly, operation of pin gate 124 prevents the delivery of two tenpins to the same turret basket and also prevents the delivery of a tenpin to the turret when the turret is not ready to receive it. As the enlarged body portion of the tenpin depresses upper pin gate arm 124*a*, it pivots gate 124 clockwise as viewed in FIG, 4 about pivot 125 thereby causing its lower arm 124*b* to swing rearwardly against a return spring 126. When lower arm 124*b* swings to the rear, it strikes a pin gate latch link 127, Pin gate latch link 127 has a shoulder 128. Prior to actuation of gate 124 by the tenpin, link shoulder 128 is engaging a pin 129 of a pivotal pin gate latch 130 thereby holding latch 130 above and spaced from a roller 131 at the end of pin gate arm 124*b*. Pin gate latch 130 is turnable about its pivot 132 and is held in up position against its return spring 133 when its pin 129 is held by link shoulder 128. When pin gate 124 strikes latch link 127, the latter is pushed back against its return spring 134 so that shoulder 128 releases pin 129 to allow spring 133 to pull latch 130 down on pin gate roller 131. When the neck portion of the tenpin, causing the foregoing action, passes over pin gate arm 124*a*, gate 124 is spring urged to move back to its original position and when it returns to its original position, the lower gate arm 124*b* is caught under pin gate latch 130 which is being spring urged in latching direction, whereby gate 124 is locked in position to block the passage of another tenpin to the forward end of conveyor 120. As seen hereinafter, gate 124 is held latched until turret 123 is indexed to advance rotatably to receive the next pin.

Turret 123 is in general drum shaped and includes an open framework of rods suitably shaped to define nine individual and vertical pin baskets spaced circumferentially about the periphery of the turret assembly. At its center, turret 123 also includes an inclined 5 pin chute 135 extending between its first and ninth baskets (the 9 and 8 pin baskets). Chute 135 serves to receive the tenth tenpin, that is to say, the No. 5 tenpin. Each turret basket is adapted to receive an individual tenpin from conveyor 120 and as will be seen hereinafter, when a tenpin is deposited in its basket, turret 123 is indexed to move so that the next basket positions under conveyor 120 to receive the following tenpin whereupon turret 123 indexes to move the next basket under conveyor 120 to receive its tenpin. This procedure continues until the tenth tenpin is released to chute 135. Turret 123 also includes a spider ring mechanism 136 having nine radially projecting spoons 137 each suitably spaced apart to support the individual nine tenpins as they stand upright in their respective turret baskets. Power for turning the turret mechanism 123 from one indexing position to the next is supplied through a turret clutch. The turret clutch is a two pulley device and involves an upper pulley 138 which is continuously turned by a drive belt 139, which belt is turned from turning power developed when pinsetter 30 is energized. Drive belt 139 and also the pin elevator and the ball return elevator are not powered through clutch mechanism 38–39, but are powered by a separate pulley system from the electric motor. This insures operation of turret 123 and the elevator wheels when clutch mechanism 38–39 is disengaged. The turret clutch also has a lower pulley 140 which actually drives the turret mechanism and thus is always engaged with the turret through a drive belt 141. An annular turret pulley 142 at the bottom of turret assembly 123 is engaged by belt 141 to turn the turret assembly. Friction drag on turret belt 141 is such that if turret 123 is not free to turn, turret belt 141 will slip on lower pulley 140. Turret 123 with its framework pin baskets and the tenth tenpin chute 135 is fixed to turret pulley 142 to rotate therewith. Spider ring 136 with its nine supporting spoons 137 is bearing mounted under turret 123 and a latch device locks spider 136 to turret 123 so that they turn together. However, when the latch device is opened, spider 136 is free to turn without turret 123 and without turret pulley turning.

Figure 5:
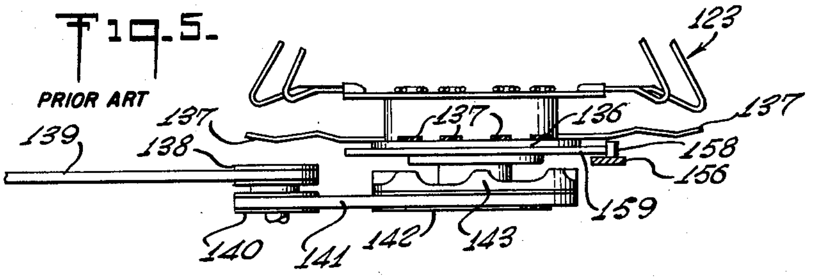
FIG. 5 is a diagrammatic plane view of the turret clutch drive assembly of said apparatus.
Figure 6:
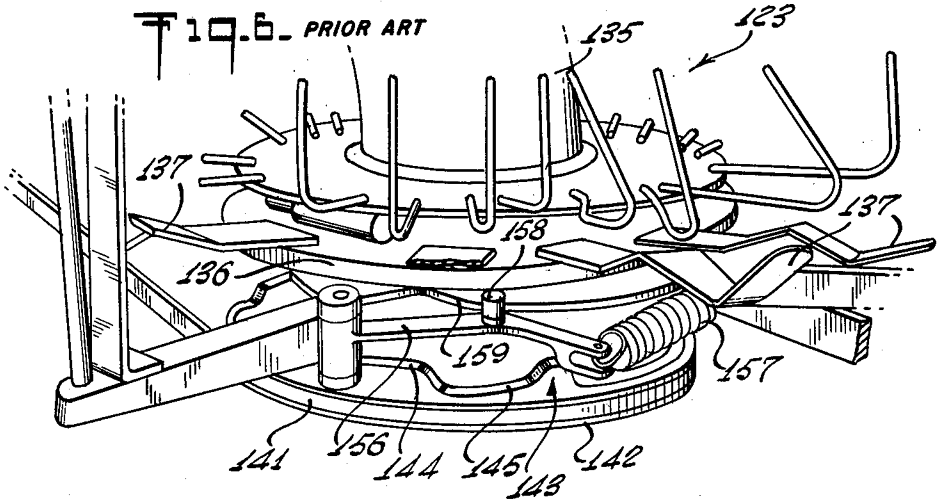
FIG. 6 is a fragmentary perspective view of the turret and also illustrates the turret release mechanism of said apparatus.

The top of turret pulley 142 is shaped to form an indexing cam 143, hence cam 143 and pulley 142 turn as one unit, FIGS. 5, 6. Indexing cam 143 has ten lobes 144 and ten depressions 145 alternating and selectively spaced about the cam perimeter. Each depression 145 is operatively associated with a correlated one of the nine turret baskets and chute 135, respectively. A stop lever roller 146 is always in register with indexing cam 143 to follow same. Roller 146 is at the front end of a pivotal two-arm stop lever 147. As roller 146 rises over a cam lobe 144, stop lever 147 pivots counterclockwise as seen in FIG. 4 about pivot 148. Pin gate latch link 127 is pinned to the rear arm of stop lever 147. Accordingly, when stop lever 147 turns CCW as its roller 146 rises over a lobe 144 on turret indexing cam 143, latch link 127 is pulled down, whereby its shoulder 128 drops below pin 129 to engage same. Then as roller 146 drops into the next cam depression 145, link 127 is pushed up and carries pin gate latch 130 upwardly to release pin gate 124 for depression by passage of the next tenpin to be delivered to turret 123. As the body of the next tenpin depresses pin gate 124, its lower arm 124*b* swings to the rear to push link 127 back whereby link shoulder 128 releases latch pin 129 to drop latch 130 down on pin gate roller 131 and when the neck of the tenpin passes over gate 124, gate 124 returns to its normal position, but with the gate lower arm 124*b* latched by pin gate latch 130 to prevent another pin from being delivered to turret 123. However, when the foregoing tenpin which just actuated and then latched pin gate 124 drops into a turret basket underneath conveyor 120, turret 123 is indexed to turn one position so that the next empty basket is available to receive a tenpin. As the turret indexes, roller 146 rides up a lobe 144 so that link 127 engages latch pin 129 to free pin gate 124 which will allow another tenpin to be delivered to turret 123. Such alternate latching and releasing of pin gate 124 is repeated as each tenpin moves along conveyor 120 and is deposited into its respective basket in turret 123.

The foregoing sequence is as follows: Assuming that there is an empty turret basket under conveyor 120 which is ready to receive a tenpin, stop lever roller 146 will be in the cam depression 145 corresponding to the particular empty turret basket. This means that pin gate 124 is free to be depressed to pass a tenpin to the waiting turret basket. After the tenpin passes over gate 124, gate 124 then becomes latched temporarily when it returns to up position to prevent the release of a second tenpin to the same basket. However, it will be seen that the tenpin released to the basket frees stop lever 147 to permit cam 143 and turret assembly 123 to turn one position, whereby roller 146 rises over a lobe 144 and drops into the next depression 145 which brings the next empty basket under conveyor 120. Furthermore, when roller 146 drops into this next depression 145, gate 124 is unlatched by this action.

The mechanism which frees stop lever roller 146 to rise and fall to allow turret assembly 123 to index is controlled as follows. As a tenpin drops from conveyor 120 into turret 123, the tenpin strikes an indexing trip lever 149 which pushes the forward end of lever 149 downward, i.e., clockwise around its pivot 150 as seen in FIG. 4. Trip lever 149 carries a link 151 connected to a pivotal bellcrank 152, which crank is pinned to a link 153. Actuation of trip lever 149, through link 151, crank 152, and link 153, rotates an indexing latch 154 pinned to the end of link 153 forward in a clockwise direction, which latch 154 prior to the foregoing action stood upright to engage or hook a small latch roller 155 on stop lever 147 such that latch 154 held stop lever 147 and thus its roller 146 down in a cam depression 145 thereby preventing turning of the entire turret assembly 123. Since turret clutch 138, 140 is always engaged and trying to turn the entire turret assembly 123, when latch 154 is lifted, this action effectively frees roller 146 to rise over a lobe 144, thereby allowing the entire turret assembly 123 to index one position to receive the next tenpin in the empty basket now under conveyor 120. Turret assembly 123 indexes only one position because trip lever 149 is spring loaded by a return spring 156*a* and thus immediately snaps back to latch stop lever latch roller 155 by latch 154. The turret assembly cannot index again until the next tenpin actuates gate 124 and trip lever 149 to repeat the foregoing procedure. The foregoing indexing process is repeated nine times for nine successive tenpins. The tenth tenpin is released to chute 135, however, this action is adapted to trigger the release of the ten tenpins to deck 101. The tenth tenpin is delivered to chute 135 which is provided with a triggering device in the bottom thereof and such triggering device is normally latched until deck 101 is in a proper position to receive the ten tenpins.

A spider release lever 156 is pivoted at one end to a fixed turret support arm and connected at its other end through a spring 157 to another fixed turret support arm. Spider release lever 156 carries a roller 158 which follows a spider release cam 159, which cam 159 is integral with spider ring 136 to turn therewith. As turret 123 indexes for the last few tenpins before receiving the tenth tenpin, release lever roller 158 encounters a rising surface on spider release cam 159, which tensions spring 157 that ties release lever 156 to a fixed reference, i.e., the second turret support arm. As the tenth tenpin drops into chute 135 and lifts a latch (to be described hereinafter) that ties spider 136 to turret 123, release lever roller 158 encounters a deep depression in spider release cam 159 and the energy from the loaded tension spring 157 is directed through cam 159 to push effectively spider ring 136 ahead of turret 123. This action removes spider spoons 137 from under the individual turret baskets, whereby the nine tenpins held therein drop into substantially upright chutes in deck 101. Simultaneously, the No. 5 tenpin in chute 135 is also dropped to a corresponding deck chute. The deck chutes are arranged in a suitable triangular array so that when deck 101 releases the ten tenpins, the pins are properly spotted on the alley floor. After release lever roller 158 snaps into the cam dwell to push spider ring 136 ahead of turret 123, roller 158 immediately encounters a sharp rise in cam 159 which prevents spider 136 from traveling any further than is necessary to release the tenpins.

Turret 123 must not release tenpins to deck 101 unless the deck is ready to receive them. This is controlled by a two-arm pin release lever 160, one arm of which 160*a* extends into the bottom of No. 5 pin bucket 135. Pin release lever arm 160*a* has a lower portion which supports the tenpin deposited in bucket 135. The other arm 160*b* of release lever 160 is provided with a latch 161 which engages a roller 162 on spider ring 136 thereby tying spider 136 to turret 123 so that they turn together as long as latch 161 engages roller 162. A parallel arm interlock link 163 has one end pivoted at 164 to pin release lever arm 160*b*. A two arm interlock probe 165 is pivoted at the outer end 166 of interlock link 163. The upright arm of interlock probe 165 is pivoted at its top 167 to an extension from the five pin bucket 135. Interlock probe 165 is spring urged in its latching direction by a spring 168, and through the linkage just described holds turret-spider latch 161 in latched position with roller 162. As the tenth tenpin falls into bucket 135 and hits pin release lever arm 160*a*, the weight of the tenpin overcomes the spring tension action on interlock probe 165, whereby pin release lever 160 is depressed about its pivot 169 causing latch 161 to swing out. The foregoing action also causes interlock link 163 to push the probing arm 170 of interlock probe outward. If deck 101 is in position to receive tenpins, interlock probe will not encounter any oppoistion to such movement, whereby spider ring 136 rotates forward with respect to turret 123 and the tenpins in the turret baskets as well as the tenpin in bucket 135 drop to deck 101. On the other hand, if deck 101 is not in position to receive the tenpins, interlock probe arm 170 is blocked against moving outward by one or both of a pair of interlock blocking fingers 171, 172. In this event, pin release lever 160 cannot be depressed and thus latch 161 will not lift the free spider 136 for turning movement ahead of turret 123. Consequently, the weight of the tenpin in chute 135 will be supported by pin release lever arm 160*a* until both of the interlocking blocking fingers 171, 172 are lifted out of the way of interlock probe arm 170, at which time the weight of the hold tenpin will trigger the foregoing latch mechanism as previously described. Interlock blocking fingers 171, 172 and the method by which they determine the time to release the tenpins to deck 101 will be described hereinafter.

Presuming all conditions are satisfactory for release of ten tenpins to deck 101, when such action occurs spider 136 will have rotated ahead of turret 123 whereby spider spoons are no longer aligned with the individual turret baskets. With respect to the tenpins dropping into the individual turret baskets, it will be recalled that each tenpin hits trip lever 149 to index turret 123 from one position to the next. However, the tenth tenpin does not hit trip lever 149 to index turret 123. Consequently, it is necessary to index turret 123 after it releases the ten tenpins to deck 101 to allow turret 123 to catch up with spider spoons 137 and then to latch turret 123 and spider 136 together so that ten new tenpins may be deposited into turret 123, whereby the indexing operation described hereinbefore is repeated. This is brought about as follows: A gear 173 is mounted under turret clutch drive pulley 138. Gear 173 is frictionally engaged to pulley 138, and both turn about the same axis. A latch gear 174 engages gear 173. Turning of both gears 173, 174 is prevented when gear 174 is latched which causes the friction surfaces between gear 173 and pulley 138 to slip. A torsion spring urged latch 175 is pivoted on a convenient turret support. A lower outstanding arm of latch 175 is urged in engagement against a block 176 on the underside of latch gear 174. As spider ring 136 turns ahead of turret 123 to release the tenpins to deck 101, an arm 177 on spider 136 hits against an upper outstanding arm of latch 175 to pivot latch 175 against its spring, whereby both gears 173, 174 start turning as the breaking action on latch gear 174 is removed. As both gears 173, 174 turn, another block 178 (wedge-shaped) on the underside of latch gear 174 rolls over a roller 179 depending from the indexing trip lever mechanism 149. Roller 179 is held by crank 152, at the end thereof pinned to link 151. This action actuates the trip lever mechanism to lift indexing latch 154 exactly as if a tenpin had hit trip lever 149. Turret assembly 123 thus is allowed to index. Since spider 136 is held temporarily stationary by spider release lever roller 158 which at the moment is caught in the spider release cam depression, turret assembly 123 catches up with spider 136, whereby both are relatched so as to turn together. The last action aligns spider spoons 137 and the individual turret baskets. The arrangement is such that sufficient time is allowed from the moment gears 173, 174 start to turn until trip lever 149 is actuated to insure that the tenpins are clear of turret 123 before it indexes and is relatched with spider ring 136.

The foregoing described interlock probe mechanism insures that turrent 123 does not release the tenpins to deck 101 when the deck is not ready to receive them. The deck must meet three requirements before it can receive tenpins. The deck must be in up position; secondly, the deck must be empty of tenpins; and thirdly, the deck must be fully forward in its pin receiving position. The deck undergoes various movements as noted hereinbefore which include forward and rearward motion as well as up and down motion. When deck 101 is fully forward and in up position, it is in position to receive tenpins from turrent 123. The other movements and positions for deck 101 and the relative movements of the tenpins in deck 101 for spotting same on the floor have no bearing on the instant invention and thus references should be made to the foregoing described publications such as the Service Manual for such information, if desired.

As the tenth tenpin drops into turret 123, it actuates lever 160 in the bottom of No. 5 pin bucket 135 which urges interlock probe 165 to move outward. Latch 161 opens if blocking fingers 171, 172 do not block such outward motion. This action releases spider 136 to rotate ahead of turrent 123 whereby the tenpins drop into deck 101. On the other hand, if deck 101 is not ready for the tenpins, the outward motion of interlock probe 165 is blocked, whereby spider 136 cannot rotate to release the tenpins to deck 101. Blocking fingers 171, 172 are located just to the rear and confronting interlock probe 165. Blocking fingers 171, 172 are adapted to pivot about a shaft axis 181, that is to say, an up and down motion with respect to blocking probe 165. If one or both of fingers 171, 172 are in down position, probe 165 contacts the confronting finger whereby probe 165 cannot move outward to release the tenpins to deck 101. Both fingers must be up to allow motion of interlock probe 165. One blocking finger 172 is controlled by a restricted drop link 182 and is used to prevent turret 123 from dumping tenpins when deck 101 is not in up position. The top end of link 182 is pinned to blocking finger 172. The lower end of link 182 is slotted at 183. An arm 180 is connected at one end to deck shaft 99 and carries at its other end a pin 184 so that pin 184 turns with deck shaft 99. Pin 184 rides in slot 183. Blocking finger 172 is held by one end of a sleeve 186, the other end of sleeve 186 carries a depending arm 186*a*. Sleeve 186 and thus blocking finger 172 are bearing mounted on a shaft 187 to turn independently of shaft 187. Blocking finger 172 is spring urged by a spring 185 in a downward or blocking direction. Spring 185 is connected to finger 172 through arm 186*a* and sleeve 186. The other end of spring 185 is connected to a convenient reference. As deck 101 lowers, link 182 is also lowered because of its connection to pin 184 thereby turning blocking finger 172 to its down blocking position to prevent turret 123 from releasing tenpins when deck 101 is down. As deck 101 returns to up position, link 182 pushes blocking finger 172 up to its probe release position. Slot 183 is used to prevent lifting of blocking finger 172 too soon as deck 101 returns to up position. Pin 184 on deck shaft 99 must be raised to the top of slot 183 before link 182 can raise to lift finger 172. This insures that tenpins are not released until deck 101 is all the way up.

The second blocking finger 171 is used to prevent turret 123 dumping tenpins into deck 101 if the deck is full or if the deck although in up position is not in its forward pin receiving position. If either one of these two conditions is not satisfied, blocking finger 171 will be in down blocking position to prevent turret 123 dumping tenpins. In other words, both conditions must be satisfied before finger 171 lifts to permit turret 123 to empty. There is a lobe 188 on the outer perimeter of turret indexing cam 143. As turret 123 indexes after receiving the tenth tenpin, lobe 188 contacts a roller 189 at the end of a long link 190 and pushes link 190 back against a return spring 191. As link 190 moves back, a spring loaded hook-latch 192 loaded down by a spring 193 snaps latch 192 over a pin 194 on the other end of link 190 and holds link 190 in rear position. As link 190 is being pushed back, a collar 195 on link 190 contacts a depending arm 196 of blocking finger 171 and turns said finger to its down blocking position. Finger 171 is carried by a sleeve 186*b* to turn therewith. Sleeve 186*b* is bearing mounted on shaft 187, whereby sleeve 186*b* and thus finger 171 can turn independently of shaft 187. Finger 171 remains latched in down position while long link 190 is held in latched rearward position. Cam lobe 188 is suitably located on index cam 143 to contact link 190 to push same back as turret 123 indexes after receiving a tenth tenpin. This indicates that turret 123 has dumped ten tenpins into deck 101 and that turret 123 should not again feed deck 101 with additional tenpins until the deck has emptied. Hook latch 192 holds link 190 back until deck 101 goes through its long "new-pin" setting stroke at 270°, at which time a projection 197 on deck shaft 99, which projection 197 is now at its highest point of rotation, contacts latch 192 and lifts it free of pin to allow link 190 to return to its original neutral position under the force of return spring 191. This will free blocking finger 171 to rotate in its spring urged upward position to lift same clear of interlock probe 165 provided the second condition is satisfied. A return spring action on finger 171 is shown at 198. The same blocking finger 171 is also controlled by a moving deck interlock linkage. A split folded over clamp 278 is attached to shaft 187 to turn therewith. The upper end of spring 198 is tied to clamp 278 below the axis 181 and the lower end of spring 198 is tied to finger arm 196. The other end of shaft 187 has a lever 199 turnable therewith and which can contact a hub 200 on a moving deck cam follower arm sheave 201. When sheave 201 is fully forward, this indicates that moving deck 101 is also fully forward, whereby hub 200 turns and holds lever 199 on shaft in a forward position. This action also rotates shaft 187 counterclockwise, whereby through shaft 187, clamp 278 and spring 198, blocking finger 171 is lifted to its up position. With blocking finger 171 in its downward locking position and as deck 101 is moving forward, shaft 187 in response to such deck movement turns counterclockwise to turn clamp 278 therewith. This action causes the upper end of spring 198 where it is tied to clamp 278 to move forward with respect to the lower end of said spring where it is tied to finger arm 196 whereby finger 171 is turned counterclockwise upward. In addition, the forward end of spring 193 also is connected to clamp 278 below axis 181 to urge continuously shaft 187 in a clockwise return direction. Consequently, when sheave 201 moves back indicating that moving deck 101 is shifted back, lever 199 and shaft 187 are spring urged by return spring 193 to turn clockwise rearwardly about axis 181. Normally, this action reacts against finger 171 through spring 198 to pull finger 171 down to its blocking position. However, to provide this result, arm 196 of finger 171 is provided with a pin 279 which is caught by the downward turning clamp 278 and thus finger 171 is engaged positively and lowered into its blocking position. When sheave 201 returns to its forward position, finger 171 returns up (assuming it is not being held by long link 190) by the action of spring 198 as noted hereinbefore. Since full deck linkage and moving deck linkage both control blocking finger 171, both linkages must be in their netural positions to allow blocking finger 171 to be in up position to clear interlock probe 165.

When the "start-stop" mechanism was described hereinabove, it was indicated that as pinsetter approaches 180° of its phase of operation, clutch release lever 57 was brought under control of turret interlock link 90 to enable clutch 38–39 to disengage at 180° in the event turret 123 had to wait for tenpins and that clutch 38–39 must be able to re-engage without ball impact when the tenth tenpin is received. The 180° stop interlock is brought about as follows. A rotatable lever 202 is pinned to the rear of long link 190. Lever 202 is connected to a shaft 203 to turn said shaft 203 as link 190 is pushed back. The other end of shaft 203 is connected to a lever 204 to turn therewith and lever 204 is pinned at 205 to a slot at the bottom of turret interlock link 90. Link 90 rises as shaft 203 rotates clockwise (as viewed in FIG. 9) and lowers as shaft 203 is rotated counterclockwise. Link 90 has slot 91 in its upper end which carries clutch release lever pin 64. When pinsetter approaches 180° first-ball strike, and 180° second ball, clutch release lever 57 is put under the control of turret interlock link 90 by the detector assembly. As pinsetter approaches 180°, pin detector link 87 is pulled to the right (see FIG. 2) which action pulls the bottom of clutch actuator link 61 to the right so that clutch release lever pin 64 drops out of open slot 65 of clutch actuator link 61. It will be seen hereinafter that this action does not occur for 180° first ball standing pin operation since there is no immediate need for ten new tenpins because the bowler has standing pins against which to bowl for second ball play.

As the pinsetter approaches 180° (first ball strike and second ball) and if turret 123 does not have ten tenpins, interlock link 90 will be in its down position because long link 190 will be in its netural position since this long link has not yet been triggered rearwardly by cam lobe 188. When turret interlock link 90 is in down position, clutch release lever 57 is free to rotate clockwise which allows stop arm 54 to move under clutch lever 46, thereby causing clutch mechanism 38–39 to disengage at 180°. When turret 123 indexes after receiving the tenth tenpin, these tenpins will have dropped into deck 101, cam lobe 188 will push long link 190 back and through the aforesaid linkage this action will cause turret interlock link 90 to rise up. The rising motion will carry release lever 57 counterclockwise so that clutch release lever projection 68 removes stop arm 54 from under clutch lever 46 whereby clutch mechanism 38–39 re-engages. Hook latch 192 holds long link 190 in its rear latched position and will also hold interlock link 90 in up position until deck 101 enters into its new pinsetting motion at 270° to release latch 192. By holding interlock link 90 up, clutch mechanism 38–39 will not disengage. Clutch release lever pin 65 is permitted to reenter clutch actuator link slot 65 prior to 360° whereby interlock link 90 no longer controls clutch release lever operation. On the other hand, if turrent 123 has ten tenpins before pinsetter reaches 180° of its phase of operation, the cam lobe 188 will have pushed long link 190 back, thus raising turret interlock link 90 and thereby holding clutch release lever 57 positively in counterclockwise position, whereby clutch mechanism 38–39 will not disengage at 180°.

An eccentric disc 206 is keyed to 2 to 1 shaft 34. Deck lowering hook 102 is clamped around the outer perimeter of disc 206. A crank pin 207 is eccentrically located on disc 206 and keyed thereto. A long slotted deck lowering link 208 is keyed to crank pin 207. When shaft 34 rotates, eccentric rotation of deck lowering link 208 is much greater than eccentric rotation of hook 102. The slot of deck lowering link 208 always engage a deck lowering pin 209 of a deck shaft arm 210 of deck lift shaft 99. When deck 101 comes down to detect tenpins and encounters standing pins, the weight of deck 101 is actually supported by the tops of the standing tenpins. Consequently, it is desired to have scissor operators (not shown) of deck 101 to lift the standing pins clear of the alley as the deck returns to up position at 180° while the dead wood is being swept into the pit. On the other hand, when a strike is thown, deck 101 will lower the full amount allowed by deck lowering hook 102 which at 90° is engaging lowering pin 209. Consequently, when it is desired to have deck 101 make the short stroke for detecting, for picking up and for respotting standing pins, deck lowering hook 102 is allowed to drop over deck lowering pin 209, whereby deck 101 cannot go lower than the short motion of hook 102. On the other hand, when it is desired for deck 101 to make the longer stroke for setting new tenpins after strike detection, or on second ball cycle, hook 102 is not permitted to engage pin 209, whereby deck 101 drops even lower as determined by the longer motion of link 208.

A cam 211 is keyed to shaft 34 and oscillates a two arm deck hook lever 212 having a follower 213 at an end of one arm. Lever 212 is pivoted to turn shaft 214. The other arm of lever 212 is connected to hook 102 by a slotted connection 215. A tension spring 216 normally holds hook 102 and lever 212 engaged at the shortest distance allowed by slotted connection 215. A hook latch lever 217 is keyed to shaft 214 to rotate therewith. Lever 217 is pinned to one end of a link 218, the other end of which is pinned to the upper arm of a two arm detector stop lever 219 pivotal about the axis of shaft 220. Stop lever 219 is in the detector assembly. The rising slope of cam 211 rotates deck hook cam lever 212 and hook latch lever 217 counterclockwise as viewed in FIG. 10 at zero and 180 degrees when deck 101 is in its up position whereby hook 102 is free of pin 209. This rotation through slotted connection 215 and tension spring 216 raises hook 102 out of path of pin 209. If it is desired for deck 101 to make its short stroke, such as at 90°, deck hook follower 213 is allowed to follow the down slope of cam 211 thereby rotating deck hook cam lever 212 clockwise to drop hook 102 into the path of pin 209. If it is desired for deck to make the long stroke to set new tenpins on the alley at 270° after a strike is detected by deck 101 at 90°, deck lowering hook 102 is held out to prevent engaging pin 209 as follows. While deck hook cam lever 212 is in its position with its follower 213 on the high spot of cam 211, a pivotal deck hook selector 221 on shaft 222 in the detector assembly is turned counterclockwise to come under the lower arm of detector stop lever 219 to prevent clockwise rotation of deck hook cam lever 212 and thus prevents its follower 213 to ride along the down slope of cam 211, whereby deck lowering hook 102 cannot swing into the path of pin 209 to engage same. This frees deck shaft arm 210 to make its long down stroke under the control of link 208.

Figure 11:
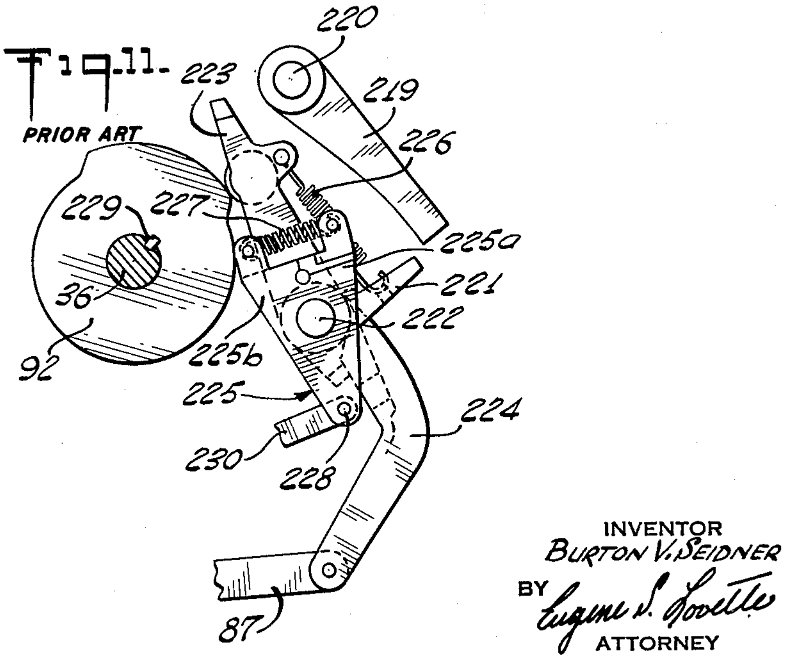
FIG. 11 is a diagrammatic plane view illustration of the timing cam strike mechanism assembly at zero degree.

The strike mechanism is directed by detector timing cam 92 which controls motion and timing of a strike cam follower 223, FIG. 11. Cam follower 223 is keyed to turn shaft 222. Timing cam 92 is the extreme left cam on main shaft 36. Cam follower 223 is continuously spring urged (by means not shown herein) in the direction against timing cam 92. Deck lowering hook selector 221, a 180° stop selector 224 and a deck scissor-moving deck selector 225 are also mounted on shaft 222. Stop selector 224 is an arm depending from follower 223 and turns therewith. Selector 221 is free to turn on shaft 222, but is connected to cam follower 223 by a spring 226 to turn clockwise about shaft 222 when pulled by follower 223. Selector 225 is made of two parts pinned together at their bottom ends 228 and spring urged together at their top ends by a spring 227. One part 225*a* of selector 225 is keyed to shaft 222. The left hand part 225*b* receives positive motion in a counterclockwise direction only and is spring urged in a clockwise direction. As viewed in FIG. 11, main shaft 36 is gear driven and rotates clockwise. As cam 92 rotates clockwise and if strike cam follower 223 is not blocked out, that is to say, cam follower 223 is permitted to follow the shape of timing cam 92, pinsetter 30 will set ten new tenpins on the alley floor. When cam 92 rotates one-quarter revolution (FIG. 11 showns the arrangement at zero degree and, therefore, a quarter revolution will turn key 229 through 90°) cam follower 223 drops into the lower level of timing cam 92. This action rotates the entire scissor-moving deck selector 225 counterclockwise to actuate a link 230 (shown in fragment herein) connected to the lower end of selector 225. Actuation of link 230 blocks out operation of the scissor operators (not shown) in deck 101. On the other hand, the counterclockwise setting of selector 225 through link 230 causes operation of the moving deck mechanism (not shown herein) so that it will set ten new tenpins on the alley floor at 270°. Accordingly, whenever strike cam follower 223 is permitted to follow timing cam 92, pinsetter 30 spots ten new tenpins on the alley floor. On the other hand, when strike cam follower 223 is prevented following timing cam 92, scissor-moving deck selector 225 will be in its clockwise setting as shown in FIG. 11 to block out the moving deck mechanism which prevents setting of ten new tenpins on the alley floor, but this setting of selector 225 will actuate operation of the scissor operators to pick up and respot the standing tenpins. FIG. 11 shows the position of cam follower 223 at zero degree which is equivalent to a setting for selector 225 to operate the deck scissors and block out deck operation to prevent setting of ten new tenpins.

Whether or not strike cam follower 223 is blocked out or permitted to ride the low level of cam 92 is made by a strike selector mechanism described hereinafter. It will also be noted that when strike cam follower 223 follows timing cam 92, that at the detecting stroke of 90°, shaft 222 turns counterclockwise which rotates deck lowering hook selector 221 in the direction to latch the lower arm of stop lever 219 so that during the next downward travel of deck 101 at 270°, deck 101 drops the full length of link 208 to set ten new tenpins on the alley. In addition, when cam follower 223 is permitted to drop into the low level of timing cam 92 and follow same, 180° stop selector 224 is also pivoted counterclockwise to pull back on pin detector link 87 which is connected to the end of selector 225, whereby the stop operations described hereinbefore can take place at 180°. Since strike cam follower 223 will not follow the low level of timing cam 92 for standing pin operation, 180° stop selector 224 is not actuated for standing pin detection, but will be actuated for 180° second ball throw.

Figure 12:
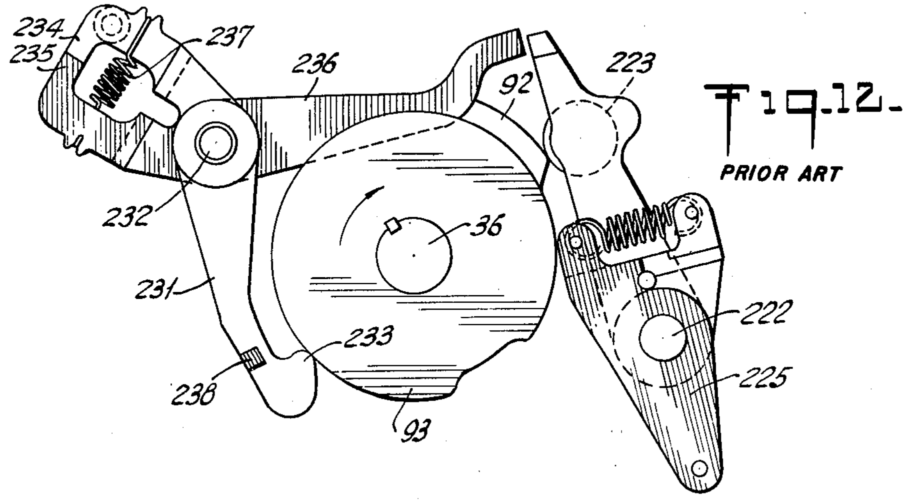
FIG. 12. PRIOR ART
FIG. 12 is a diagrammatic plane illustration of the strike selector mechanism at zero degree.
Figures 13, 14, 14A:
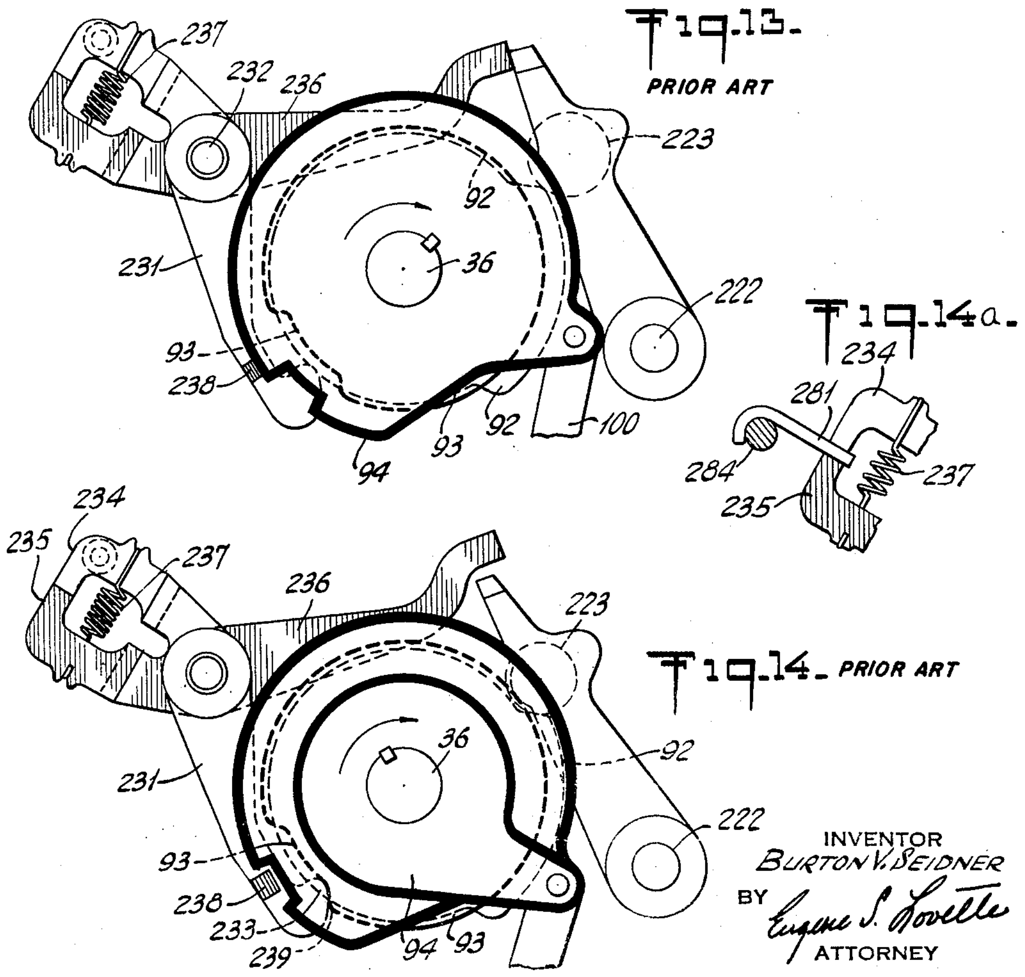
FIG. 13. PRIOR ART, FIG. 14a., FIG. 14. PRIOR ART

The strike selector mechanism is shown at zero degree position prior to first ball impact in FIG. 12 and includes selector cam 93 keyed to shaft 36 between timing cam 92 and detector disc 94. A two arm strike controller 231 is freely turnable on a shaft 232 and has a follower 233 on its lower arm. Strike controller 231 is always spring urged in the direction so that its follower 233 is urged to follow the outer perimeter of selector cam 93. The other arm of controller 231 has a turned end 234 defining a flat face which is spring urged to bear positively against a confronting face of a turned end 235 of a two arm strike selector 236 also freely mounted for rotation on shaft 232. Spring 237 between the upper arms of controller 231 and selector 236 urge ends 234, 235 together. The arrangement is such that strike selector 236 receives positive motion from strike controller 231 in a counterclockwise direction only about shaft 232. FIG. 13 shows the strike mechanism at 90° detecting standing pins. FIG. 14 shows the strike mechanism at 90° detecting a strike. In FIGS. 13 and 14, detector disc 94 is shown as an extremely heavy outline. Selector cam 93 behind disc 94 and strike controller 231 are shown by lighter weight lines. Timing cam 92 and strike cam follower 223 are shown by the lightest weight lines. Disc 94 pivots freely about main shaft 36 on a hub of selector cam 93 and its position is determined by the position of deck lift shaft 99 through detector rod 100. Accordingly, for FIG. 14, deck 101 is at its lowest level permitted by hook 102; whereas for FIG. 13, deck 101 is slightly higher because it is resting on the standing pins. Accordingly, in FIG. 13, disc 94 will have moved clockwise but not enough to permit a projection 238 on strike controller 231 to drop into one of the disc cut-outs. For standing pin detection, projection 238 rides along the rear of disc 94. This action holds strike selector 236 in a position whereby its outer end confronts the end of strike cam follower 223 to block same out and thus allows standing pin operation to occur since strike cam follower 223 cannot fall into the low level of timing cam 92. In FIG. 14, disc 94 will have turned clockwise slightly more than standing pin detection, whereby projection 238 falls into the disc cut-out so that strike selector 236 turns to clear strike cam follower 223 thereby allowing the latter to follow the low level of timing cam 92, whereby pinsetter 30 undergoes strike operation. In the latter situation, when deck 101 starts to rise to return to 180°, strike controller follower 233 rises from a cam low to a high at 239 allowing selector cam 93 to push projection 238 out of the disc cut-out. As controller 231 turns clockwise when projection 238 escapes the disc cut-out, strike selector 236 turns to follow same until the underside of its outer end drops down to rest on the outer end of cam follower 223 which is riding along the lower level of timing cam 92. This action does not interfere with operation of cam follower 223, however, it does prevent further clockwise turning movement of strike selector 236 which causes the upper arms of selector 236 and a controller 231 to move apart against holding spring 237 so that a gap forms between the spreading confronting faces of turned ends 234, 235.

The entire strike operation is summarized as follows. Ball impact causes clutch mechanism 38–39 to engage. Deck assembly makes the short detecting stroke because stop lever 219 is not blocked by deck lowering hook selector 221. After one-quarter of a revolution of the 1 to 1 shafts, deck 101 is in a strike detecting poistion. When a strike is detected, detector disc 94 is positioned so that projection 238 on strike controller 231 fits into a disc cut-out. Cam follower 223 is allowed to follow timing cam 92 to block the scissor operator mechanism and thus allowing the moving deck mechanisms to operate so as to set ten new tenpins on the alley floor at 270°. Deck lowering hook selector 221 is now spring urged to move under stop lever 219 to block out deck lowering hook 102 so that deck 101 can make the long stroke at 270° whereas the 180° stop selector 224 rotates counterclockwise to prepare pinsetter for a 180° stop should turret 123 lack ten tenpins for spotting same on the alley at 270°. Deck 101 returns to up position at 360° after setting the ten tenpins on the alley floor and clutch mechanism 38–39 disengages at 360° to wait for the delivery of the next first ball.

It will be understood that much of deck mechanism and the operation of the detector assembly for standing pin operation and second ball operation has been omitted simply because this background information is readily available in the aforesaid publications and is not necessary for an understanding of the invention. However, following is mentioned to acknowledge operation of a linkage shown in FIG. 2. A wire link 240 is shown in FIG. 2 connected at its upper end to selector latch 82 in order to pull same down against spring 80. Actuation of link 240 is controlled by the detector assembly and, in particular, by a two arm standing pin cam follower 241 keyed to a shaft 242. The lower arm of follower 241 is connected to the bottom end of link 240. The upper arm of follower 241 is adapted to follow timing cam 92. The selection of whether or not cam follower 241 is blocked out, that is to say, prevented from riding along the lower level of timing cam 92, is determined by a standing pin selector mechanism which includes a selector 243 (a fragment thereof is shown in FIG. 2), which selector moves out of and into the path of follower 241 as determined by whether or not its co-acting standing pin controller (not shown) engages a cut-out in detector disc at 270° position. If deck 101 is setting ten new tenpins after detecting a strike, a projection on the standing pin controller rides along the high outer perimeter of detector disc 94 which is at this time turned to its maximum clockwise position thereby causing the entire standing pin selector mechanism into a counterclockwise position about its shaft. This action pushes standing pin selector 243 down into the path of cam follower 241 to prevent same from riding the lower level of timing cam 92 whereby follower 241 is held in its counterclockwise position and thus pulls latch 82 down in register with roller 84 so that reset lever assembly 67 is controlled by inner cam follower 81 riding inner cam 85 which effects disengagement of clutch mechanism 38–39 to stop pinsetter 30 at 360°. On the other hand, when deck 101 is respotting standing pins on the deck alley at 270°, deck 101 is at a higher level than the aforesaid example and thus detector disc 94 is not turned as far clockwise. In this situation, the projection on the standing pin controller drops into a detector disc cut-out which turns the standing pins selector mechanism to raise standing pin selector 243 out of the path of cam follower 241, whereby the latter rides along the lower level of timing cam 92. This action turns follower 241 clockwise about shaft 242 to permit reset latch 82 to rise and release roller 84 such that reset lever assembly 67 is controlled by outer cam follower 78 riding along outer cam 86. This causes clutch mechanism 38–39 to disengage and pinsetter 30 to stop at the 90° override. Follower 241 is also blocked out at 90° override standing pins so that pinsetter 30 is stopped at 360° after second ball play. Moreover, standing pin cam follower 241 also actuates a deck holding hook selector 244 so that the deck is held up at the 90° override. A detailed illustration of these matters will be found in the aforesaid Brunswick publications.

As stated in the objects, the instant invention modifies the standard pinsetter 30, whereby the machine will supply any selected combination of tenpins from one to ten in number to permit a bowler to bowl against the desired combination of tenpins for spare practice. In making his selection, if the bowler selects to bowl against ten tenpins, he is bowling a normal game. By virtue of the instant invention, a bowler may wish to practice only against a single tenpin or two tenpins or three tenpins, such as pin Nos. 6, 9 and 10, or any other number and combination of tenpins. Pinsetter 30 in accordance with the invention will spot on the alley floor the selected pins constituting the spare combination desired by the bowler. The machine will continue to respot this combination until the bowler calls for a different combination, whereby the machine may be actuated to spot a new combination of desired spare pins on the alley floor.

In order to spot the desired group of tenpins making up a spare combination on the alley floor, dwell blocks 250 are placed into the individual cam index dwells 145 corresponding to those tenpins that are not called for by the desired combination of spare play, except that a dwell block is not inserted into the No. 5 pin dwell. In other words, the No. 5 pin dwell of indexing cam 143 and each of the dwells 145 corresponding to the tenpins desired by the bowler for his spare play combination remain unblocked as in normal operation, whereas all other index cam dwells 145 are blocked by individual blocks 250. The dwell blocks 250 are made of suitable material such as steel, and each is selectively shaped to fit into a respective index dwell 145. The nine dwell blocks 250 are each removably attached by one or more screws 249 to their respective dwells 145 so that any one or more of the blocks may be readily removed or attached, whereby spare play combinations may be changed without any difficulty whenever a bowler requires such change.

Figure 15:
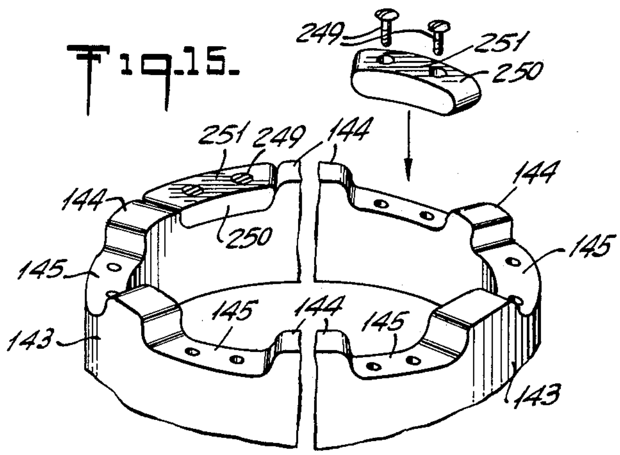
FIG. 15 is an exploded illustration in perspective of the indexing cam and dwell blocks in accordance with the invention.

In FIG. 15, indexing cam 143 is shown with blocks 250 in one of its dwells. The top face 251 of each block 250 is designed to be level and coplanar with the riding surfaces of cam lobes 144, whereby stop roller 146 will travel smoothly along the alternating coplanar surfaces of lobes 144 and block surfaces 251 until roller 146 reaches an empty dwell 145 and drops therein to latch turret assembly 123 whereby the turret basket corresponding to the empty dwell is held under conveyor 120 to receive a tenpin. When an individual dwell 145 is blocked, roller 146 will by-pass same and thus conveyor 120 will not deposit a tenpin into the basket corresponding to the blocked dwell, because as turret 123 rotates during indexing travel, pin gate 124 is locked in up position to prevent the release of a tenpin into turret 123. This situation continues until roller 146 drops into an empty dwell 145 which action latches the turret 123 and frees pin gate 124 to deliver a single tenpin to the turret. It may be recalled that when a tenpin passes gate 124, this action relocks gate 124 to prevent further delivery of a tenpin to the turret until roller 146 drops into the next empty dwell. Hence, when a tenpin which has been passed by gate 124 falls into the basket corresponding to a selected tenpin of the spare play combination, trip lever 149 is actuated to permit turret 123 to index. The entire turret assembly 123 by reason of its turret clutch assembly 138, 140 will continue to turn until turret assembly 123 is again latched by roller 146 dropping into an empty low dwell 145. Accordingly, turret 123 will turn in an indexing direction until roller 146 falls into the next open dwell.

Figure 16:
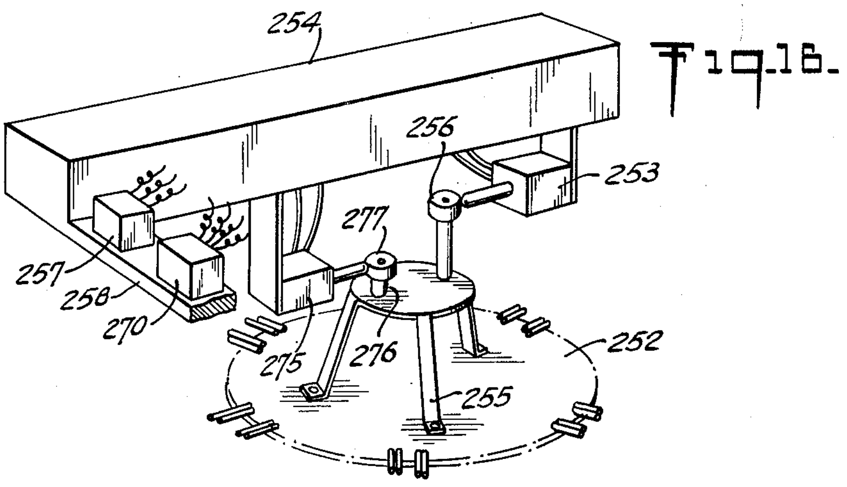
FIG. 16 is a diagrammatic illustration in perspective of the turret center plate supporting a tripod support means for actuating the pin gate switch and the No. 5 pin spider release switch in accordance with the principles of the invention.
Figure 17:
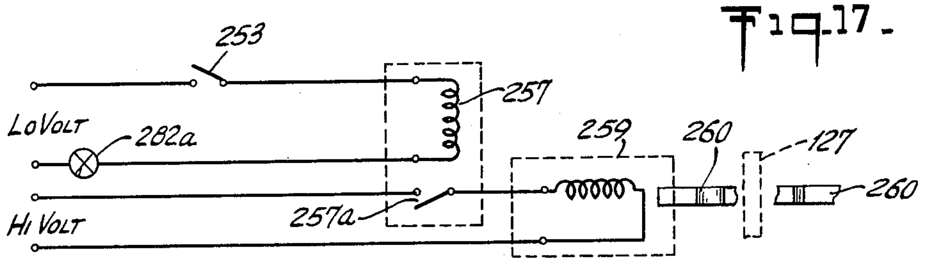
FIGS. 17 through 21 are electrical schematics of circuits in accordance with the principles of the invention.
Figure 25:
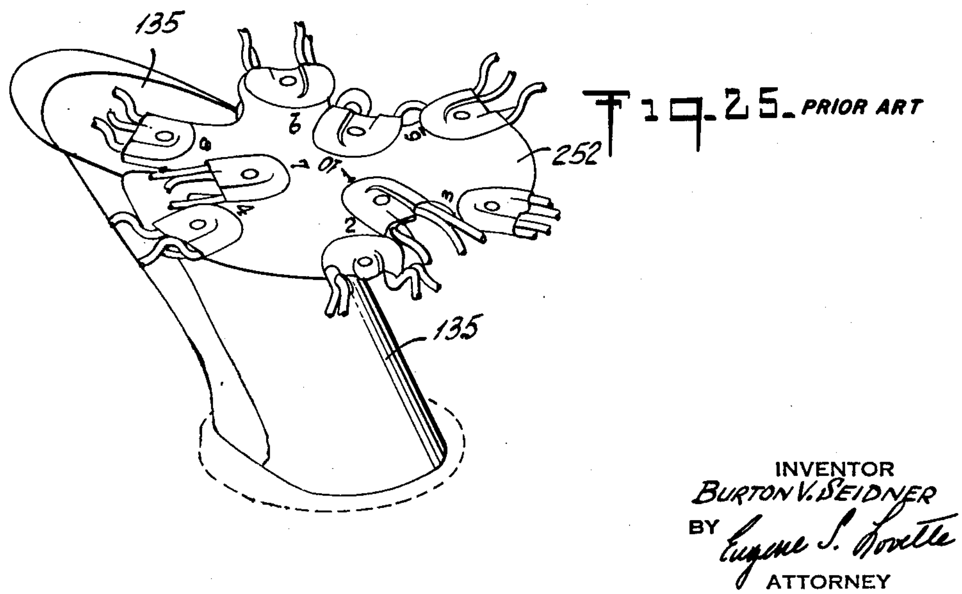
Fig. 25. PRIOR ART
FIG. 25 is a diagrammatic illustration of the center plate of the turret for the purpose of showing the circumferential relationship of the chute and turret baskets and their correspondence with the individual tenpins.

For example, let us assume that the bowler wishes to bowl against a spare combination made up of the Nos. 6, 9 and 10 tenpins. A top view of turret 123 is shown schematically in FIG. 25. Reading clockwise around the top of turret 123 and starting with the No. 5 pin chute 135, the nine turret baskets correspond, respectively, to the 9 pin basket, 10 pin basket, 6 pin basket, 3 pin basket, 1 pin basket, 2 pin basket, 4 pin basket, 7 pin basket and 8 pin basket. In other words, 5 pin chute 135 is in between the Nos. 8 and 9 pin baskets. Turret 123 has a relatively flat top central plate 252. The upper inner ends of the framework rods defining the turret baskets are held by plate 252. Accordingly, the ten dwells 145 along the perimeter of indexing cam 143 follow the same sequence, that is to say, the No. 5 pin dwell is followed by the 9 pin dwell which is followed by the 10 pin dwell, and so on, in the same order as the turret baskets. It will be understood that turret normally turns counterclockwise. Assuming that the No. 9 pin basket is under conveyor 120, pinsetter 30 will deposit a tenpin into the 9 pin basket and then into the 10 pin basket and then into the 6 pin basket in accordance with normal operation. Since dwells 145 for Nos. 3, 1, 2, 4, 7 and 8 pin baskets are blocked, turret 123 will index until roller 146 drops into the dwell for the No. 5 pin chute. If the spare combination included a No. 5 pin, the foregoing operation would be satisfactory, because when roller 146 falls into the empty 5 pin dwell, a tenpin will be delivered to chute 135 whereby the four tenpins (Nos. 5, 6, 9 and 10) now in turret 123 will be released to pinsetter deck 101 and ultimately spotted on the alley floor. However, the foregoing example does not contemplate a No. 5 pin. Accordingly, the following additions are made to pinsetter 30 in accordance with the principles of the invention. A normally open electrical microswitch 253 (the pin gate switch) is fastened to and supported from the underside of an electrical box 254 of the pinsetter and overhanging turret 123, FIGS. 16, 17. A tripod support 255 or any other type of support means is fastened by screws or other convenient means to turret center plate 252. Support 255 is provided with an upright rigid extension carrying a roller 256 at its upper end. The spaced relationships of switch 253, tripod 255 and roller 256 are selected so that roller 256 will strike and depress the switch button of switch 253 to close this switch just about the time stop roller 146 is about to drop into the No. 5 pin dwell.

A relay 257 is mounted on a long structural beam support 258 extending over turret 123. A pin gate locking solenoid 259 is suitably fastened and mounted to an arm of the existing turret support frame assembly 280 of pinsetter 30 underneath conveyor 120. Solenoid 259 carries an outstanding pin gate locking link 260. The outer end of link 260 is provided with a slot 261, and slot 261 fits around pin gate latch link 127. Slot 261 is long enough to allow latch link 127 to move up and down and back and forth without interfering with normal operation of latch link 127 or with normal operation of the turret indexing mechanism. Switch 253 is in series with the coil of relay 257 (see FIG. 17). The normally open relay armature **257*a* is in series with solenoid coil 259. Accordingly, when switch 253 is closed, relay armature 257*a* closes to energize solenoid 259. The lead wires across relay coil 257 may be connected to a low voltage source provided by the existing pinsetter electrical circuit. The lead wires across solenoid coil 259** may be connected to a high voltage source provided by the existing pinsetter electrical circuit.

As turret 123 is turning to move the No. 5 pin dwell in front of roller 146 whereby roller 146 is about to drop into the No. 5 pin dwell, switch 253 is closed by roller 256. This energizes solenoid 259, which action pulls back link 260 and thus moves pin gate latch link 127 rearwardly to prevent latch link shoulder 128 to engage pin 129 on pin gate latch 130. It will be recalled that during normal operation, when roller 146 drops into the No. 5 pin dwell, link 127 is actuated to engage pin 129 to free pin gate 124 in order to pass a tenpin to the No. 5 chute 135. In accordance with the foregoing modification, link 127 cannot rise to effect such action as roller 146 drops into the No. 5 pin dwell. Conseqnently, pin gate 124 is not released but remains latched in such position to prevent any tenpin dropping into the No. 5 pin chute. When roller 146 drops into the No. 5 pin dwell, turret 123 is latched in this position and will no longer turn. It will be understood that when solenoid 259 is not energized that the neutral link 260 will not interfere with the normal action of latch link 127.

Turret 123 now contains the tenpins constituting the selected spare combination. It is now desired to open spider 136 to deliver these tenpins to deck 101. As depicted in FIG. 3, a normally open microswitch 262 (the restricted drop-deck up switch) is rigidly fastened to a rigid structural member carried by the front cross-rod 283 of the existing turret brace assembly. For convenience, is is preferable to locate switch 262 along the right hand side of pinsetter 30. The right hand side of the machine is distinguished from the left hand side when viewed from a position in front of pinsetter 30. Accordingly, it will be understood that the location of switch 262 is selected so that it is supported over the upper deck arm 111 along the right side of pinsetter 30. An adjustable post 263 is suitably atached to said deck arm 111. The spaced relationships of these members are selected so that each time deck 101 is in its up position, either at zero degree, 90° overtravel or 180°, post 263 strikes and depresses the switch button to close switch 262. In lieu of the foregoing and preferred arrangement, switch 262 may be rigidly fastened to other convenient and existing turret support means adjacent deck shaft 99 and a rigid V-shaped pad **263*a* may be welded or, otherwise, attached to shaft 99; see FIG. 3A for this alternative embodiment. The spaced relationship of these members are selected such that each time deck 101 is in its up position, the apex of 263*a*** will strike and depress the switch button to close switch 262, as noted hereinabove. The former arrangement is preferred because the timing of closing switch 262 on arm 111 may be selected and controlled with greater accuracy than with pad 263*a* on deck shaft 99, because the radial distance of post 263 from the axis of turning (the axis of shaft 99) is greater than the radial distance of pad 263*a* from such axis.

A normally closed microswitch 264 (the interlock long link switch) is suitably fastened to support means depending from the existing support arm of the turret support frame assembly 280, which arm extends above the rearward end of long link 190. For convenience, the support for switch 264 may be associated with the support for solenoid 259 with the latter above switch 264 since both are mounted to arm 280. The arrangement is such that switch 264 is supported rigidly in space alongside of link 190. An operator 265 is fastened to and held by long link 190 and has an extension adapted to strike and depress to open switch 264. The spaced relationship of these members are selected so that when long link 190 is in neutral position (not latched), operator extension 265 does not press against the switch button of switch 264, whereby said switch remains closed. When long link 190 is moved rearwardly, extension 265 is caused to press against the switch button of switch 264 to open same. Switch 264 remains open while link 190 is latched in its rear position. When link 190 is released to return to its neutral forward position, extension 265 is withdrawn, whereby switch 264 closes.

Figure 18:
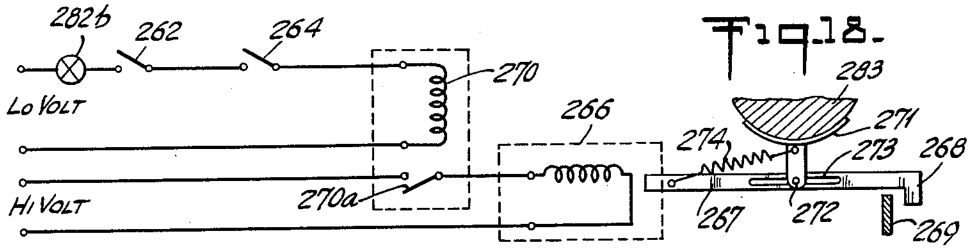

A spider release solenoid 266 is rigidly fastened to the existing turret support arm 280 and next to pin gate locking solenoid 259 by screws or other convenient means. Solenoid 266 carriers a long spider release link 267 which has a turned hook 268 at its outer end. An upright projection 269 is welded to arm 170 of probe 165. The spaced relationship of these members are selected to be as follows. When solenoid 266 is not energized, hook 268 is held in a predetermined position in space to permit projection 269 to come alongside of hook 268 when the turning turret assembly 123 reaches the position whereby its No. 5 pin dwell is latched by roller 146. A second relay 270 is mounted alongside of relay 257 on support 258. Referring to FIG. 18, switches 262 and 264 are electrically in series with relay coil 270. The normally open relay armature 270*a* is in series with solenoid coil 266. Accordingly, when both microswitches are closed, relay arm 270*a* closes to energize solenoid 266 which pulls link 267 rearward. This action is arranged to occur when the halted projection 269 is alongside hook 268 which in turn pulls interlock probe 165 rearward in a direction to cause turret-spider latch 161 to release spider roller 162, whereby spider 136 advances by the action of its spider release mechanism to drop all the tenpins held by turret 123 into deck 101.

Figures 7, 8:
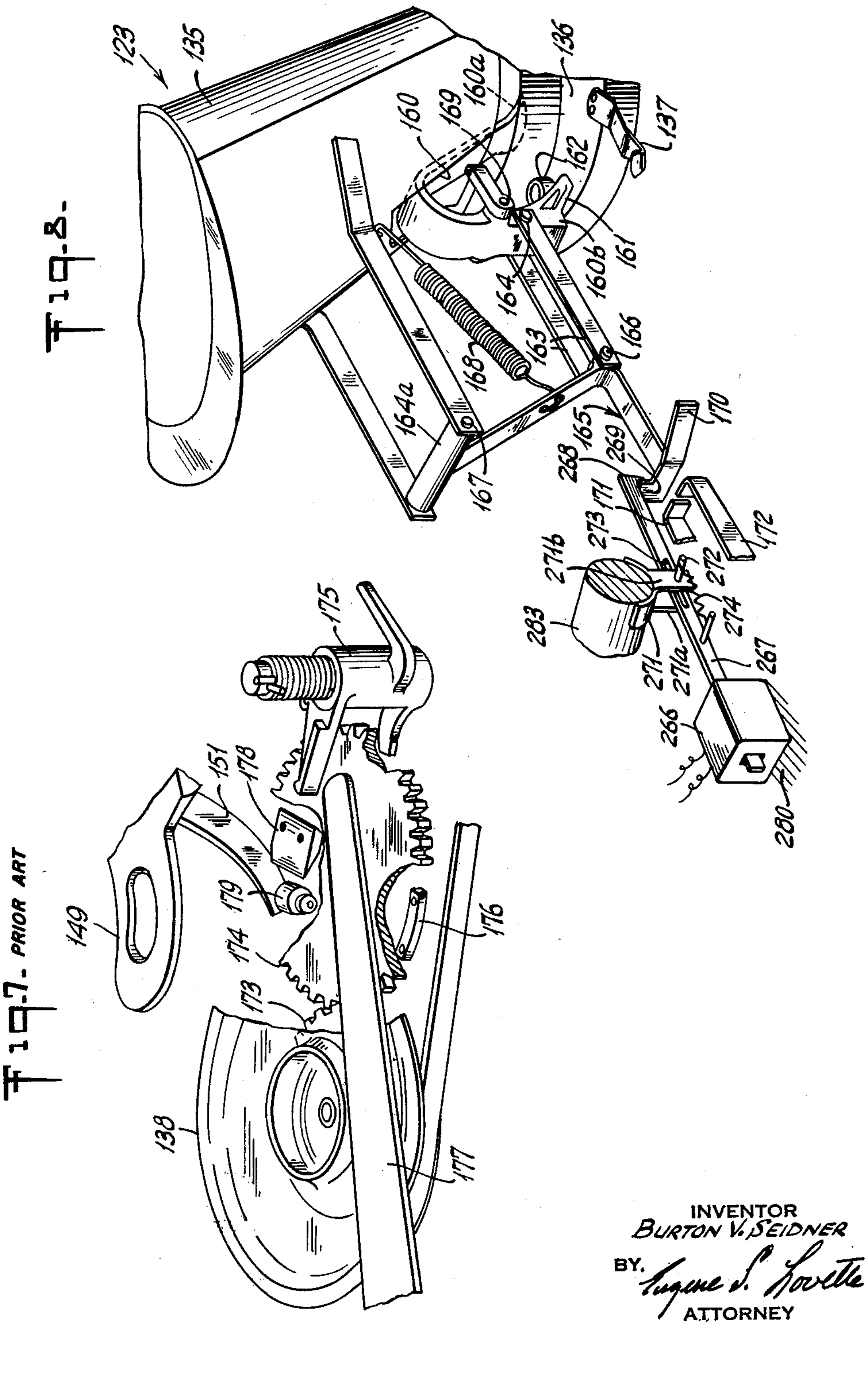
FIG. 8. FIG. 7. PRIOR ART
FIG. 7 is a diagrammatic perspective view partly broken away illustrating the turret No. 5 pin indexing mechanism of said apparatus.
FIG. 8 is a diagrammatic perspective view of the turret No. 5 pin triggering device and also illustrates the spider release solenoid for effecting spider release in accordance with the principles of the invention.
Figure 24B:
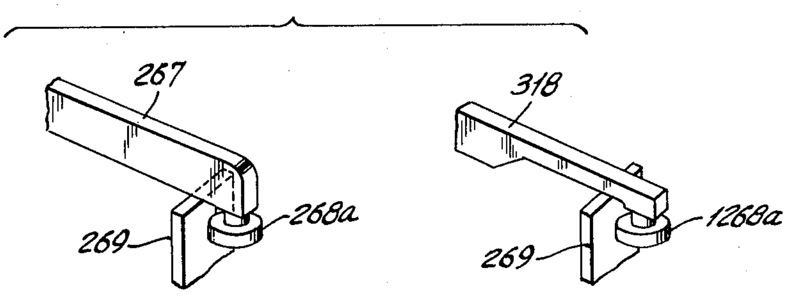
FIG. 24B illustrates spider release links employing rollers instead of hooks as shown in the previous embodiments.

Link hook 268 should occupy a fixed position in space to permit projection 269 to stop to the rear and alongside of hook 268 when the No. 5 pin chute 135 is latched in front of conveyor 120. Link 267 is suitably supported in space to effect this result by a bracket 271. Bracket 271 is fastened by screws to the rigid cross-rod 283 of the turret brace complete assembly, which rod 283 conveniently extends parallel with and above deck shaft 99. Bracket 271 includes a pair of closely spaced and parallel depending flanges 271*a*, 271*b*, which flanges straddle the opposed sides of link 267. This arrangement prevents link 267 swaying to the left or the right, because bracket flanges 271*a*, *b* serve as longitudinal guide means maintaining link 267 in alignment. Bracket flanges 271*a*, *b* support a smooth cylindrical pin 272 extending horizontally between same, whereby each end of pin 272 is held by a respective one of the bracket flanges. Pin 272 extends horizontally through a long slot 273 in link 267, whereby pin 272 acts as a bearing in slot 273 to permit lengthwise movement of link 267 with respect to the relatively stationary pin 272. This arrangement also maintains spider release link 267 relatively orthogonal to pin 272 to prevent rocking of link 267 in an up and down manner, whereby link 267 is always oriented to hook over projection 269 when turret 123 is latched at the No. 5 pin dwell. Pin 272 is fixed in space because it is connected to front cross-rod 283 through bracket 271 and this arrangement in combination with the fact that solenoid 266 is rigidly bolted to a fixed reference 280 provides support means which hold link 267 horizontally level, whereby link 267 will not swing up or down or sway left or right to insure proper hooking of projection 269 and also to avoid interference with operation of the adjacent parts of the probe-interlock system of the pinsetter. A return spring 274 is connected from link 267 to bracket 271, and when link 267 is mounted, as shown in FIG. 8, it extends alongside finger 171. By reason of the pin-slot arrangement 272–273, link 267 is capable of moving only lengthwise forwardly or rearwardly. When solenoid 266 is not energized, spring 274 maintains link 267 in forward position to permit the halted projection 269 to stand upright and close behind hook 268. When solenoid 266 is energized, link 267 is pulled back and this action hooks projection 269 to pull probe 165 to release spider 136. After the time delay action, FIG. 7, turret 123 indexes whereby its chute 135 turns away from zero position under conveyor 120 so that turret 123 catches up to spider 136. This action carries projection 269 therewith and thus causes projection 269 to rotatably slide past hook 268. Actual tests have shown that projection 269 will slidably advance against hook 268 without any difficulty during this phase of the indexing operation. However, to facilitate such movement, hook 268 may be replaced by a roller 268*a* as shown in FIG. 24B. Roller 268*a* is supported by the front end of link 267 to turn about a vertical axis and is adapted to hook over projection 269. When turret 123 indexes to advance the No. 9 basket in front of conveyor 120, roller 268*a* rolls against the side of projection 269. When solenoid 266 is de-energized, link 267 returns to its forward position by the action of spring 274.

Operation of spider release solenoid 266 is as follows. Assume first that pinsetter 30 has sufficient tenpins to constitute three sets of pins desired for the selected spare combination. In the illustrated example, pinsetter 30 is operated to spot automatically the Nos. 6, 9 and 10 tenpins. Hence, three of the tenpins will be on the alley floor for play; three of the tenpins will be in pinsetter deck 101; and the other three tenpins will be in the pit or on their way to the turret 123, or in the last instance, in turret 123 awaiting delivery to deck 101. Consequently, when the bowler rolls against Nos. 6, 9 and 10 tenpins on the alley floor, the ball impact signal triggers the machine into automatic operation. The set of tenpins in deck 101 are spotted on the alley floor and when deck 101 returns up and forward at 360°, the set of tenpins in turret 123 are ready to drop into deck 101. Since switches 262 and 264 are in series with relay 270, the tenpins in turret 123 are not released to deck 101 until both switches are concurrently closed which requires two conditions to be satisfied. As noted hereinbefore, when deck 101 is up at zero degree, 90° (second ball) and 180°, post 263 strikes switch 262 to close same. However, switch 264 is not closed until long link 190 is in its neutral forward position. As deck 101 is spotting a set of spare tenpins on the alley floor at 270°, hook latch release 197 actuates hook latch 192 to allow long link 190 to return to its forward neutral position whereby switch 264 is closed. Consequently, when the empty deck 101 returns to its up and forward position to receive new spare tenpins, the interlock system is in condition to energize solenoid 266 to actuate spider 136 to deposit the tenpins in turret 123 into deck 101. As seen from FIG. 18, electrical lead lines to relay 270 may be connected to a low voltage supply in the existing pinsetter electrical circuit for energizing relay 270; whereas the lead lines to solenoid 266 are connected to a high voltage supply of the existing pinsetter electrical circuit for energizing solenoid 266.

Spider release solenoid 266 also may be actuated by a single microswitch arranged to energize relay 270 in lieu of the series combination of switches 262 and 264. For this alternative arrangement, see FIGS. 16, 20, a second and normally open microswitch 275 is fastened to the underside of box 254. A second rigid and upright extension 276 is mounted to support 255. A roller 277 is supported at the upper end of upright 276. Roller 277 is arranged to strike and depress the switch button to close switch 275. The spaced relationship of roller 277 and switch 275 is selected so that roller 277 strikes switch 275 to close same when the No. 5 pin chute 135 is stopped in front of conveyor 120. When the action is properly timed, switch 275 is closed when roller 146 is latched in the 5 pin dwell and projection 269 is juxtaposed hook 268. Switch 275 is connected electrically in series with relay 270, hence when switch 275 is closed by roller 277, solenoid 266 is energized. It is understood that the lead lines to relay 270 are connected to a low voltage supply of the existing pinsetter electrical circuit for energizing relay 270. If switch 275 is employed for actuating spider-release solenoid 266, switch 275 and roller 277 are supported at a horizontal level in space different than the level for roller 256 and switch 253 to avoid interference of one set of roller-switch with the operation of the other set.

Figure 19:
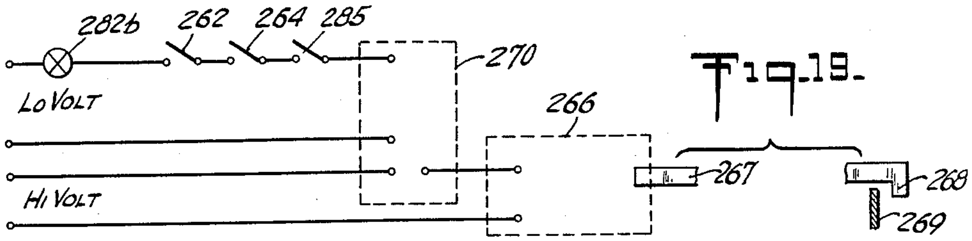

In FIG. 18, it is seen that spider release solenoid 266 is energized when the series connected switches 262, 264 are simultaneously closed. FIG. 19 shows another alternative embodiment which includes a third microswitch 285 (the moving deck switch) in series with switches 262 and 264, whereby all three switches are required to be simultaneously closed to energize solenoid 266. Moving deck switch 285 is a normally open microswitch fastened by suitable means to an existing moving deck cam follower arm 286, see FIG. 9. The lower end of arm 286 is connected to sheave 201 to move therewith. Arm 286 is pivoted at its upper end about a pin 287 and has an extension carrying a follower roller 288 engaging a moving deck scissor deck cam 289, which cam is keyed to 1:1 shaft 35. An adjustable switch operator 290 is suitably fastened to the overhead cross-rod 283. Switch 285 and operator 290 are arranged in spaced relationship, whereby operator 290 strikes to depress the switch button of switch 285 to close same only when deck 101 is in forward position to receive tenpins. It will be understood that by reason of the operation of the existing pinsetter 30, arm 286 pivots about the axis of pin 287, whereby switch 285 is carried to meet the depending operator 290 to actuate and close switch 285 when deck 101 is in forward position. Consequently, when this embodiment is employed to release spider 136, all three series connected switches must be simultaneously closed to effect the release of tenpins in turret 123 to drop into deck 101.

Figure 21:
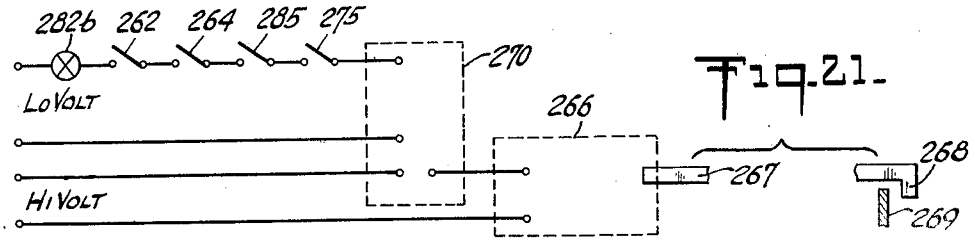

It will be understood that the single 5 pin switch 275 also may be used in lieu of the three-in-series switch arrangement shown in FIG. 19 to actuate spider release solenoid 266. Even though the use of switch 275 is not necessary to effect spare practice play, in order to obtain the advantage of automatic 180° stop operation for spare practice play, a No. 5 pin position switch 275 should be used in series with switches 262 and 264 or in series with switches 262, 264 and 285 for the purpose of actuating spider release solenoid 266. For the purpose of illustration, FIG. 21 shows schematically switch 275 in series with the three switches 262, 264 and 285.

The operation of the spare play pinsetter 30 for first ball and second ball is the same as normal pinsetter operation. For example, with the 6, 9 and 10 tenpins, or for any other desired spare combination on the alley floor, pinsetter 30 will spot the same combination as a first ball strike if the bowler knocks down all the tenpins of the spare combination. Otherwise, pinsetter will lift up the standing pins and respot them. In the latter situation, the bowler is not really bowling against this desired spare combination since certain of the tenpins will have been knocked down by his first ball. Accordingly, a further modification is contemplated in accordance with the principles of the invention which includes the insertion of a spacer 281 of suitable material, such as steel, and approximately ⅛ of an inch thick between the abutting faces of turned ends 234 and 235 of strike controller 231 and strike selector 236 as shown in FIG. 14A. Spacer 281 may be hooked to an existing and adjacent fixed reference 284 to hold same in place. As long as spacer 281 is held between ends 234, 235, selector 236 is turned so that regardless of what happens upon first ball roll, strike selector 236 is lifted out of the path of strike cam follower 223, whereby cam follower 223 will ride the low level of timing cam 92 to provide a pinsetter strike operation. In this situation, whenever the bowler bowls a ball, whether he knocks down all, some or none of the spare combination tenpins, pinsetter 30 will reset another set of the same spare combination of tenpins and will do so repeatedly until a different combination is called for.

In the illustrative example, the spare pin combination did not include a No. 5 pin. Should a bowler desire a combination of spare tenpins, which includes the No. 5 pin, it will be necessary to neutralize the pin gate locking circuit to free pin gate 124 for normal operation and also to neutralize the spider release solenoid circuit inasmuch as when a 5 pin is delivered to the 5 pin chute 135, it is desirable to have spider 136 released in accordance with normal operation. To effect this, a ganged switch is provided with normally closed contacts 282*a*, 282*b* in the lines of relays 257 and 270, respectively. When switch contacts 282*a*, *b* are open, the pin gate locking solenoid circuit and the spider release solenoid circuit cannot be energized. As noted hereinbefore, the neutralized pin gate locking link 260 will not interfere with normal operation of pin gate latch link 127. Furthermore, it will be noted from FIG. 18 that spider release link 267 and, in particular, its hook 268 will not interfere with normal operation of probe 165 because when turret 123 turns to bring projection 269 alongside the adjacent hook 268, the underside of link 267 clears projection 269 for rearward movement without any interference with normal operation of probe 165, and when the No. 5 pin falls into its chute 135 and triggers spider release in accordance with normal operation, probe 165 moves rearward to release the spider.

With respect to the pin gate locking circuit and the spider release circuit, it will be understood that known commercial units may be employed for relays 257, 270 and solenoids 263, 266. The invention requires adjustments whenever a different combination of tenpins are desired for spare play. In the illustrative example, the spare play combination involved the 6, 9 and 10 tenpins. If a different combination is then called for, such as the 4, 5, 7 and 8 tenpins, dwell blocks 250 are fastened to the 6, 9 and 10 tenpin dwells, whereas dwell blocks 250 are removed from the 4, 7 and 8 tenpin dwells and switch contacts 282*a*, *b* are opened (blocks 250 are already in dwells 1, 2, 3). The instant invention lends itself readily to quick adjustments from a central control point by electrical means. For example, nine dwell blocks 250 may be permanently incorporated in the indexing cam 143 (the No. 5 tenpin dwell does not have a block), whereby the individual blocks are adapted for slidable movement radially toward the center of cam 143 and in the opposite direction to its periphery. When a block 250 is in its latter position, it will be blocking its individual dwell and when the block is withdrawn radially toward the center of cam 143, the individual dwell is empty to receive roller 146. This motion may be controlled by a plurality of solenoid electrical circuits acting upon the individual blocks 250 for selectively moving same and which circuit may be actuated from one central control center. Furthermore, the ganged switch for contacts 282*a*, *b* may be operated from the same control center. In addition, spacer 281 may be arranged for insertion and removal movement with respect to ends 234, 235 of controller 231 and selector 236 by means of a solenoid circuit operated from the same control center, whereby any one pinsetter 30 of a large bowling alley may be readily switched from normal tenpin play to spare tenpin play and in the latter instance, the combination of spare tenpins may be selected merely by opening and closing selected solenoid units. When pinsetter 30 is to be used for normal play, dwell blocks 250 are removed from all the cam dwells 145, spacer 281 is removed from between controller 231 and selector 236, and switch contacts 282*a*, *b* are opened. This will allow pinsetter 30 to function for the usual tenpin bowling game.

The improvements shown and described hereinafter rely substantially upon electrical circuit means to achieve automatic spare practice play without the need of employing dwell blocks 250 in indexing cam 143. A two-level rotary switch 300 is shown schematically in FIGS. 23, 24 wherein each level consists of a ring-shaped platform 301, 302 of suitable insulating material supported one above the other in fixed spaced relationship above turret plate 252 by suitable support rod means 303. Support means 303 may be fastened to electrical box 254 or other convenient pinsetter structure to hold the suspended platforms 301, 302 in desired fixed spaced relationship above turret 123. Each platform level 301, 302 is provided with ten circumferentially spaced wiper contacts 304*a*, *b* electrically isolated from each other, and which contacts 304*a*, *b* are numbered 1 to 10 in the schematic of FIG. 22 to show their operative correlation with the individual ones of the like numbered ten tenpins and their index cam dwells 145.

In level 301, each wiper contact 304*a*, except for the No. 5 tenpin contact, is conductively connected by a respective connecting line to the input side of a relay 305 through individual switch contacts correspondingly numbered 1 to 4 and 6 to 10. Upon actuation, relay 305 energizes a solenoid 306. Solenoid 306 carries a link 307. The outer end of link 307 is attached to link 153 of the turret indexing mechanism. For convenience, this connection may be effected where link 153 is pinned to bell crank 152. The circuit and operation of relay 305 and solenoid 306 is the same as that shown previously for such similar components. Hence, when the coil of relay 305 is energized, its armature closes to actuate solenoid 306. This action pulls link 307 rearward which in turn pulls link 153 rearward to turn indexing latch 154 forward to release roller 155 in the same manner as if a tenpin actuates indexing trip lever 149 by dropping from conveyor 120 into turret 123, whereby turret 123 indexes to the next tenpin dwell. Since this embodiment of the invention does not employ blocks 250, all the index dwells 145 are empty, hence when solenoid 306 is energized, turret 123 indexes to the next tenpin dwell in accordance with existing pinsetter operation. When relay 305 is de-energized, the action of return spring 156*a* also returns link 307 to its forward inactive position at the same time indexing latch 154 is turned to relatch turret 123. Solenoid 306 may be mechanically supported by any existing overhanging and convenient bracing or turret support structure adjacent or behind indexing trip lever 149 to support link 307 for connection of same to link 153 as noted hereinbefore.

Figure 20:
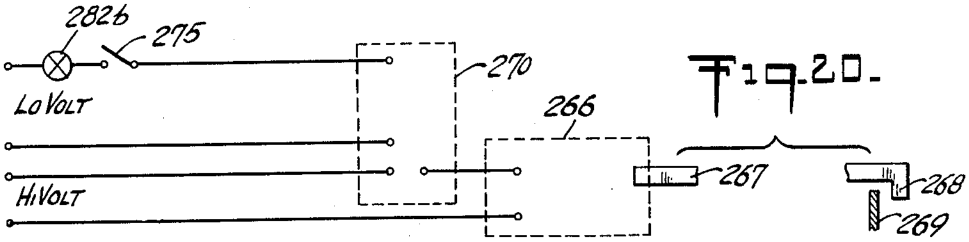

The No. 5 tenpin wiper contact in level 301 is connected by its individual connecting line to a switch contact correspondingly numbered 5, and this switch contact is connected through the electrically series micro-switches 262, 264 and 285 to the input of relay 270 for operating spider release solenoid 266. It will be understood that this embodiment contemplates the use and operation of switches 262, 264, 285, relay 270, solenoid 266, its link 267 and operatively associated projection 269 for the purpose of triggering the spider release as described hereinbefore. In addition, it will be understood that wiper contact No. 5 (in level 301) in series with switches 262, 264 and 285 is also the equivalent of the "zero degree" micro-switch 275 and its roller operator 277 as shown in FIG. 20. Again, it will be realized that switch 285 is optional as described hereinbefore.

In lower level 302, each wiper contact 304*b* is conductively connected by a respective connecting line to the input side of relay means 257 through individual switch contacts correspondingly numbered 1 to 10. As disclosed hereinbefore, relay 257 actuates pin gate solenoid 259 and thus pulls back on link 260 for deactuating pin gate latch link 127 whenever relay 257 is energized, whereby pin gate 124 will be latched to prevent the feed of a tenpin. Hence, it will be understood that this embodiment also contemplates the use and operation of relay 257, solenoid 259 and the operative control of link 127 by solenoid link 260 as described hereinbefore except now pin gate 124 may be latched for any one of the ten tenpins dwells 145.

An upright wiper support arm 308 is mounted and fixed at its lower end to turret plate 252, whereby arm 308 turns with turret 123. Arm 308 extends upright through the central openings of the ring-shaped levels 301, 302 and carries a pair of outstanding wiper arms 309, 310, which wipers turn with support arm 308 as turret 123 turns. The outer ends of wiper 309, 310 are arranged to contact slidably the individual switch contacts 304*a*, *b* in correlation with turning of turret 123. Wiper 309 is operatively associated with contacts 304*a* on the upper level 301, whereby wiper 310 is operatively associated with contacts 304*b* of lower level 302. To complete the electrical circuit, each wiper 309, 310 may be made of conductive material and each wiper is connected to a voltage source 311 through any conventional slip-ring means 312*a*, *b*, and individual ones of branch connecting lines 313*a*, *b* and a master switch 314. Source 311 may be an existing low voltage supply in the pinsetter circuit. As noted hereinbefore, solenoids 259, 266 and 306 are connected across an existing high voltage supply.

For normal tenpin bowling play, master switch 314 is kept open. This prevents actuation of solenoids 259, 266 and 306, whereby pinsetter 30 functions in accordance with its existing mode of operation to provide ten tenpin bowling play. Consequently, the instant rotary switch embodiment 300 may be permanently installed to all pinsetter machines, if desired. Attachment of link 307 to turret indexing mechanism link 153 will not interfere with the normal operation of the indexing mechanism during the time solenoid 306 is inactive.

For automatic spare play, master switch 314 is closed, and each of the individual line switches numbered 1 to 10 in the upper and lower levels 301, 302 are closed except for those switches the numbers of which correspond to the tenpins that are desired for spare practice play. In other words, if a player wishes to bowl against the group made up of the 1, 3 and 10 tenpins, the individual switches numbered 1, 3 and 10 of both levels are opened, whereas all the other switches including the No. 5 switch in level 301 are closed. Since in the practice of this embodiment, the like numbered line switches in both levels 301, 302 are either both opened or both closed, for convenience these pairs of switches are ganged as illustrated herein so that the ganged pairs may be open or closed in one action. This will involve ten double pole single throw switches. Master switch 314 and the ten double pole single throw switches numbered 1 to 10 may be located at the approach end of the alley to permit the alley operator to control spare practice play for any individual pinsetter machine.

The purpose of level 302, i.e., solenoid 259, is to block or prevent selectively the delivery of tenpins to turret 123 during automatic spare play, that is to say, when solenoid 259 is energized, pin gate 124 stops the feed of tenpins from conveyor 120 to turret 123. For example, if the spare play involves the 1, 3, 10 tenpins, the operation of switch 300 is such that pin gate 124 will prevent the feed of tenpins from conveyor 120 except when the Nos. 1, 3 and 10 turret baskets are under conveyor 120 to receive a tenpin in each to constitute the desired spare play combination. On the other hand, when the other turret baskets and chute 135 are under conveyor 120, turret 123 will index without the feed of a tenpin to these baskets and chute 135. The switch circuit involving the No. 5 wiper contact (level 301) and its series switches No. 5, 262, 264 and 285 serves to energize solenoid 266 when the No. 5 pin chute 135 is under conveyor 120. Solenoid 266 is energized when the series micro-switches are simultaneously closed, which action causes turret 123 to drop the spare tenpins therein into deck 101 and then causes turret 123 to index to its next position to bring the No. 9 pin basket under conveyor 120. Correlated with the action of level 302, the energized solenoid 306 will index turret 123 from one cam index dwell 145 to the next to advance the turret 123, whereby chute 135 and each tenpin basket comes under conveyor 120 except that the No. 9 pin basket is indexed under the conveyor by the action of spider release. Since this action is correlated with level 302, as to any selected tenpin of the ten, the turret can index without receiving a tenpin.

Operation of the circuit will be described for a spare play combination made up of the 1, 3 and 10 tenpins. Looking down on turret 123 from above, it will be understood that wipers 309, 310 turn counterclockwise with respect to the fixed rotary switch wiper contacts 304*a*, *b*. It will be assumed that chute 135 is under conveyor 120. Turret 123 will index to advance the No. 9 pin basket under conveyor 120 upon actuation of solenoid 266 and this occurs when the various conditions for actuating its circuit are simultaneously closed, i.e., deck 101 is up, forward and empty by reason of previously spotting tenpins on the alley floor which also means that fingers 171, 172 are in up position to permit link 267 to pull interlock probe 165 rearward by engaging projection 269 thereon. As the turret advances to position, the No. 9 basket under conveyor 120, index roller 146 rises out of index dwell 145 corresponding to the No. 5 pin and rides along lobe 144 preceding dwell 145 corresponding to the No. 9 pin basket. Since the No. 9 tenpin is not called for, it is desirable to prevent normal operation of link 127 not later than a few degrees of turret turning before roller 146 drops into the No. 9 pin dwell. Moreover, neutralizing link 127 should continue for at least a few degrees of turret turning after roller 146 drops into the No. 9 pin dwell and travels therealong to guard against normal operation of link 127. When roller 146 drops into the No. 9 pin dwell, pursuant to existing operation, this action will raise link 127 to catch pin 129 to raise latch 130 to free pin gate 124. However, pursuant to the instant improvement, solenoid 259 will be energized by the time roller 146 drops into the No. 9 pin dwell and for at least a reasonable interval thereafter, whereby the feed of a tenpin to the No. 9 pin basket is prevented. As roller 146 advances towards the trailing end of the No. 9 pin dwell, it will not rise over the next lobe 144 because indexing latch 154 is in up position thereby holding the No. 9 pin basket under conveyor 120. At least a few degrees prior to this moment, wiper 309 should pass over the leading edge of the No. 9 wiper contact in lever 301 which energizes solenoid 306 to trigger link 153 to index turret 123 whereby the No. 10 pin basket positions under the conveyor. Very soon after this indexing action commences, both wipers 309, 310 pass the trailing edges of their respective No. 9 wiper contacts.

Figure 22:
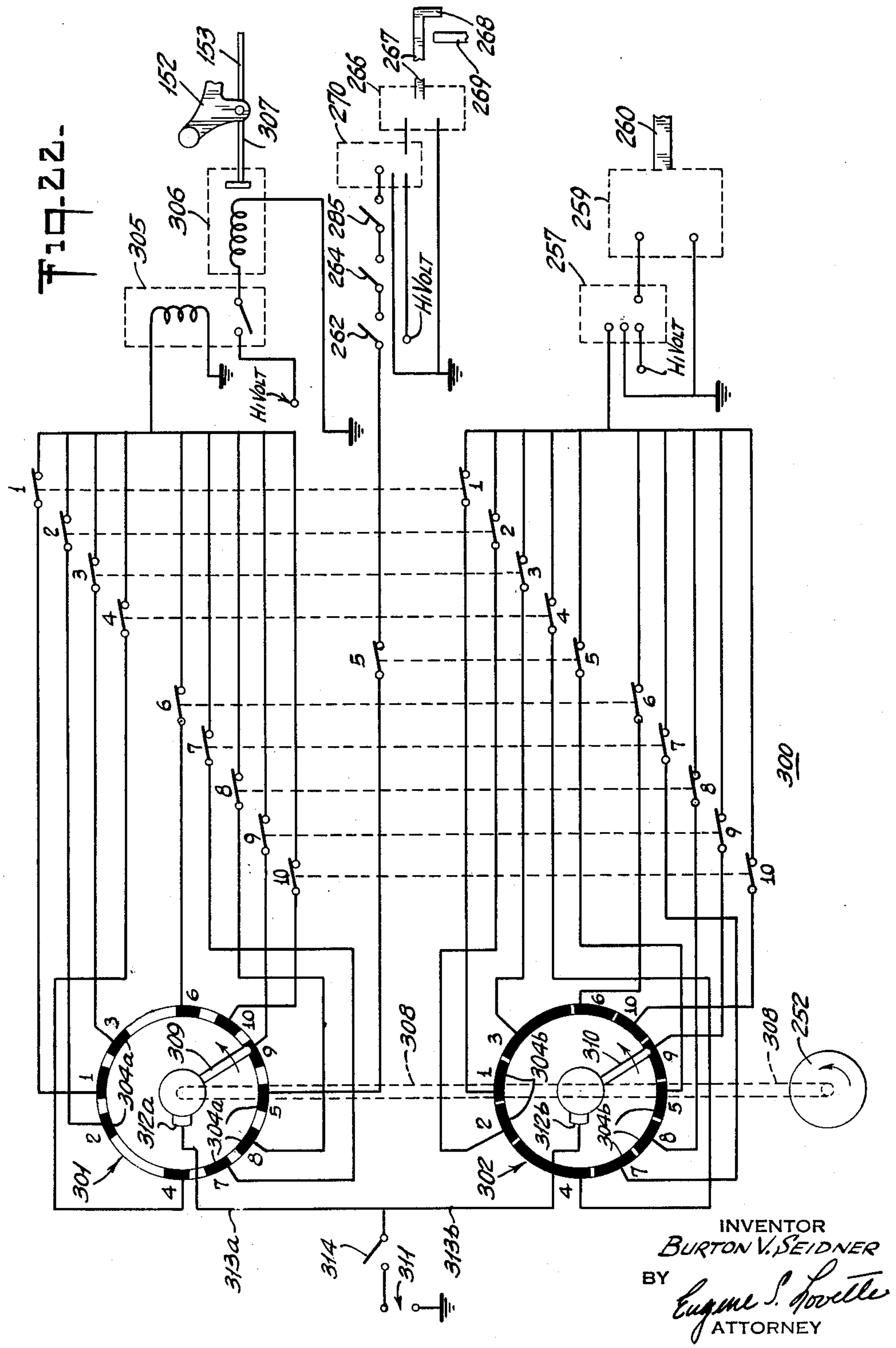
FIG. 22 is an electrical schematic of an alternate embodiment of the invention for actuating the pin gate solenoid, the spider release solenoid and which involves the addition of a turret indexing trip lever solenoid.
Figure 23:
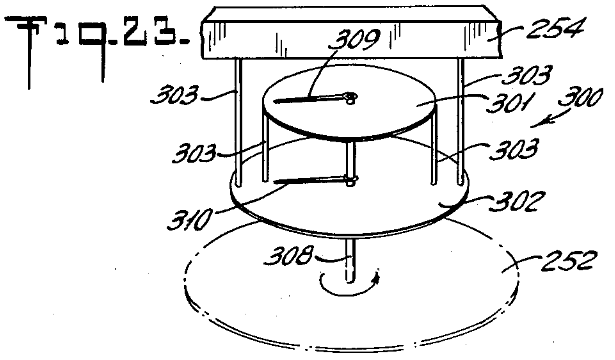
FIG. 23 is a diagrammatic plane view of the rotary switch shown in FIG. 22.

It will be understood that wipers 309, 310 start conductive contact with their respective wiper contacts upon passing over the leading edges thereof and these conductive contacts continue until the wipers pass over and leave the trailing edges of their respective wiper contacts. In the illustrated embodiment, the leading edges of the individual wiper contacts 304*a* in level 301 are located to effect contact with wiper 309 a few degrees of turret turning just before trip lever 149 should be tripped to cause the correlated basket or chute to index past conveyor 120. On the other hand, the leading edges of the individual contacts 304*b* in level 302 are relatively advanced to effect contact with wiper 310 immediately after the preceding basket or chute is indexing away from conveyor 120. FIG. 22 shows the leading edge of each wiper contact 304*b* spaced as close as possible without contacting the trailing edge of the preceding wiper contact 304*b* in level 302. This latter arrangement also may be used in level 301, if desired. The trailing edges of all the wiper contacts are shown to break contact with their respective wipers very soon after the correlated basket and chute starts to index past the conveyor.

The above-described spare practice play calls for a No. 10 tenpin. Consequently, the No. 10 ganged switches are opened, whereby solenoid 259 is not energized for the No. 10 pin basket, i.e., solenoid 259 is not energized when roller 146 drops into the No. 10 pin dwell. Solenoid 259 also remains unenergized as roller 146 travels along this dwell. This assures conventional operation of link 127 when roller 146 drops into the No. 10 pin dwell. When such action occurs, pin gate 124 is free to release a tenpin when the No. 10 pin basket positions under conveyor 120. When the tenpin passes gate 124, the gate is relatched in accordance with existing operation. This action also indexes turret 123 to position the No. 6 pin basket under conveyor 120. Since a No. 6 pin is not called for, its correspondingly numbered ganged switches are closed which assures that link 127 is removed from conventional operation to maintain gate 124 locked as the No. 6 basket positions under conveyor 120. The No. 6 pin basket is then indexed away from conveyor 120 without any tenpin therein by reason of the operation of level 301. This operation is similar to that described for the No. 9 pin basket.

Ganged switches 3 and 1 are opened, hence the corresponding baskets each receive a tenpin in accordance with existing pinsetter operation. Ganged switches 2, 4, 7, 8 and 5 are closed. Accordingly, the correlated baskets and chute 135 are not fed tenpins by reason of operation similar to that described for the No. 9 pin basket. Wiper 309 will pass over the leading edge of its No. 5 wiper contact before roller 146 reaches the "stop" position along the No. 5 pin dwell, however, turret 123 returns to its "zero" position with chute 135 latched under conveyor 120 waiting for spider release. With chute 135 latched under conveyor 120, spider release solenoid 266 is energized when the spider release switches 262, 264 and 285 are simultaneously closed and fingers 171, 172 are up, whereby the three tenpins in turret 123 drop into deck 101 and the foregoing cycle of operation repeats.

If a spare play combination involves the No. 5 pin, the ganged switches No. 5 corresponding thereto are open to allow the feed of a tenpin to chute 135 in accordance with existing pinsetter operation. When the No. 5 pin drops in chute 135, spider 136 is actuated to drop the tenpins in the turret into the deck and the turret is indexed to its No. 9 pin basket position in accordance with existing pinsetter operation.

Figures 24, 24A:
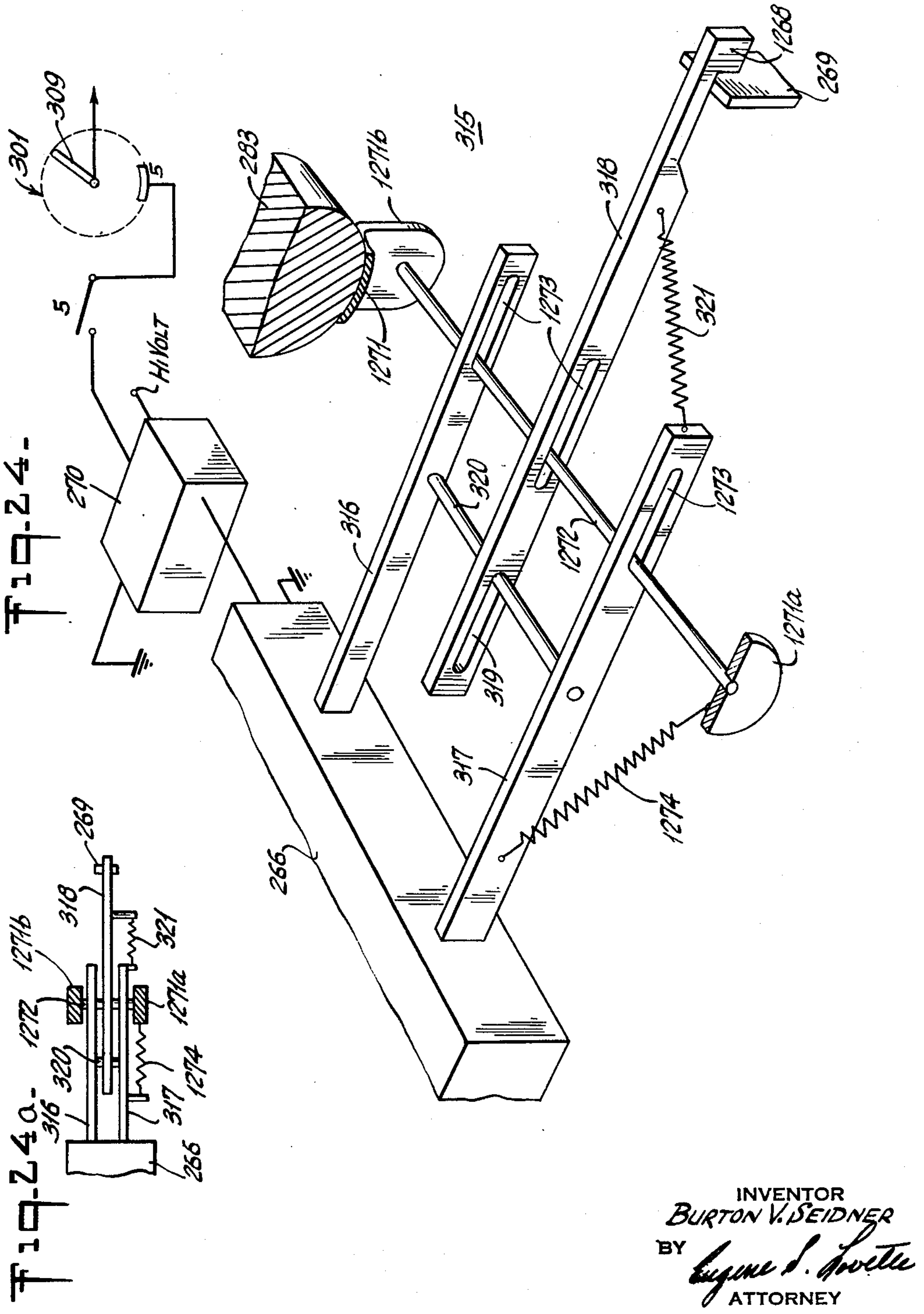

The three switches 262, 264 and 285 may be eliminated from the energizing circuit of solenoid 266 if spider release link 267 in replaced by a split link 315 as shown in FIGS. 24 and 24A. Split link 135 involves a pair of links 316, 317 extending along the opposite sides of a center link 318. Each link 316, 317, 318 has a longitudinal bearing slot 1273 for passing a stationary cross pin 1272 therethrough. The ends of cross pin 1272 are fixed to a pair of parallel bracket flanges 1271*a*, 1271*b*, which flanges straddle the outer sides of links 316, 317. Flanges 1271*a*, 1271*b* depend from bracket 1271, which bracket is attached to cross-rod 283 of the turret brace assembly, whereby the front end of split link 315 is suitably supported in space. The foregoing elements correspond to pin 272, slot 273 and bracket 271 for supporting link 267. The rearward ends of links 316, 317 are connected to solenoid 266 and are pulled back upon energization of said solenoid. Solenoid 266 is carried by reference 280 as described hereinbefore. Center link 318 has a second longitudinal bearing slot 319 for passing a pin 320 therethrough. The opposite ends of pin 320 are attached to outside links 316, 317 to move therewith. When solenoid 266 is not energized, pin 320 is adjacent the front edge of slot 319, whereas pin 1272 is adjacent the rear edges of slots 1273 of the three links as shown in FIG. 24. A spring 321 is connected between center link 318 and an outside link 317 and a return spring 1274 is connected between an outside link 317 and the fixed reference 1271 as shown in the figures.

When the zero position switch 5 is closed and wiper 309 contacts its wiper contact No. 5, solenoid 266 is energized whereby links 316, 317 are pulled rearwardly. Link 318 has a hooked end 1268 which corresponds to hook 268 of link 267. The operative relationship of hooked end 1268 is such that when turret 123 indexes to position chute 135 under conveyor 120, hook 1268 confronts projection 269 on probe 170 to engage same for actuating spider release upon energization of solenoid 266 in the same manner as described for link 267. If both fingers 171, 172 are up, projection 269 and thus probe 170 are free to be pulled back. When outer links 316, 317 are pulled back, this motion is transmitted to center link 318 through spring 321 whereby hook 1268 engages and pulls projection 269 rearward to actuate spider release without a tenpin being fed to chute 135. The long slots 1273 clear pin 1272 for rearward motion of the three links 316, 317, 318. If one or both of the fingers 171, 172 are in down position temporarily blocking spider release, the outside links 316, 317 are pulled back upon energization of solenoid 266. However, center link 318 cannot follow because probe 170 and thus projection 269 are blocked. Hook 1268 engages the stationary projection 269 to prevent center link 318 following outer links 316, 317 which stretches spring 321. Cross pin 320 during this action advances towards the rear edge of slot 319. When the condition which is causing one or both fingers 171, 172 to remain down no longer persists and after both fingers 171, 172 pivot up to clear probe 170, the force transmitted to center link 318 through the stretched spring 321 moves link 318 rearward which also pulls projection 269 rearwardly to actuate spider release. Return spring 1274 is stretched whenever the outside links 316, 317 are pulled rearward upon energization of solenoid 266. When solenoid 266 is de-energized, outside links 316, 317 are returned to forward or neutral position by the action of return spring 1274, whereby cross pin 320 carries center link 318 forward therewith as said pin rides against the forward edge of slot 319.

With respect to FIG. 24, the three links 316, 317, 318 and the bracket flanges 1271*a*, *b* straddling the outer links are illustrated in an exploded relationship to show the features thereof with greater clearness. In actual use, however, it will be understood that flanges 1271*a*, *b* are closely spaced to the respective outer links 316, 317 as shown in FIG. 24A and that the three links themselves are closely spaced apart, whereby bracket flanges 1271*a*, *b* serve as alignment guides so that the entire combination cooperates to prevent the front hook end 1268 of link 318 against swaying to the left or right during use. This insures that hook 1268 is suitably located in space to come alongside of projection 269 for hooking same when turret 123 is halted at its "zero" position, i.e., chute 135 under conveyor 120. In addition, it will be understood that split link 315 is held against swaying up and down by the fact that horizontal and stationary pin 1272 engages the three bearing slots 1273 of the three links 316, 317, 318. As noted hereinbefore, the operating hook end 1268 of link 318 may involve a roller 1268*a* as shown in FIG. 24B instead of hook 1268 for acting against projection 269 which will facilitate movement of projection 269 away from link 318 upon turret indexing from the 5 pin position to the 9 pin position.

It is intended that all matter contained in the above description or shown in the accompanying drawings shall be interpreted as illustrative and not in a limiting sense.

What is claimed is:

1. In an automatic pinsetter for tenpin bowling play and having a deck for setting tenpins on a bowling alley floor, a revolvable turret having nine tenpin baskets and a chute for individually receiving a tenpin and releasing same to said deck, conveyor means for feeding a tenpin to each turret basket and said turret chute as said turret indexes to position said baskets and chute individually under said conveyor, an indexing cam operatively associated with said turret and having ten dwells individually correlated with respective ones of said baskets and said chute, stop lever means having a follower riding along said indexing cam, trip lever means operatively regulating said stop lever means to permit its follower to leave one dwell and enter the next dwell as said turret indexes to position said baskets and chute individually under said conveyor, said stop lever means normally latching said turret when said stop lever follower engages a dwell as said turret indexes to position the corresponding basket or chute under said conveyor means for feeding a tenpin thereto, said trip lever means being actuated by the feed of a tenpin to said turret to actuate said stop lever follower to leave one indexing cam dwell and to enter the next dwell whereby said turret indexes, gate means operably associated with said conveyor means for normally blocking the release of tenpins from said conveyor means to said turret and being conditionable by said stop lever means to permit the release of a tenpin to said turret when said stop lever follower enters an index dwell, passage of a tenpin by said gate means activating said gate means to assume its blocking status until said stop lever follower enters the next cam dwell, said chute including means for effecting the release of tenpins stored in said turret and then actuating said trip lever means to index said turret whereby said chute revolves away from the pin receiving position under said conveyor, means rendering said tenpin release effecting and trip lever actuating means normally responsive to the delivery of a tenpin to said chute, the combination comprising, means for selectively controlling the operation of said pin gate means to prevent the feed of a tenpin to preselected ones of said turret baskets and also for controlling operation of said trip lever means for indexing each turret basket denied a tenpin away from the pin receiving position, electrical solenoid means for selectively controlling operation of said pin gate means to prevent the feed of a tenpin to said chute, said solenoid means also being equipped to operate said tenpin release effecting and trip lever actuating means when said chute is thus denied a tenpin, and means including switch means responsive to turret turning for selectively actuating said solenoid means.

2. In an automatic pinsetter for tenpin bowling play and having a movable deck for setting tenpins on a bowling alley floor, a revolvable turret having nine tenpin baskets and a chute for individually receiving a tenpin and releasing same to said deck, conveyor means for feeding a tenpin to each turret basket and said turret chute as said turret indexes said baskets and chute individually under said conveyor means, an indexing cam operatively associated with said turret and having ten dwells individually correlated with respective ones of said baskets and chute, stop lever means having a follower riding along said indexing cam, trip lever means operatively regulating said stop lever means to permit its follower to leave one cam dwell and enter the next cam dwell as said turret indexes to position said baskets and chute individually under said conveyor, said stop lever means normally latching said turret when its follower engages a dwell whereby a correlated basket or chute is held under said conveyor means for feeding a tenpin thereto, said trip lever means being actuated by a tenpin striking same upon the feeding of such tenpin to a turret basket whereby said stop lever means is actuated to allow said turret to index from one cam dwell to the next cam dwell, said deck occupying a first position with respect to said turret for setting a new set of tenpins on the alley floor and occupying a second position with respect to said turret for receiving tenpins from said turret, movable interlock probe means carried by said turret and having a pin release lever projecting into said chute to be actuated by a tenpin dropping therein, turnable spider means having spoons individually and normally aligned with a respective one of said turret baskets for holding a tenpin therein, turret latch-spider means on said interlock probe means for latching said spider to turn with said turret, said pin release lever being actuated for movement in a direction to release the tenpin fed to said chute to said deck upon such tenpin striking said pin release lever which motion carries said interlock probe means in a positive direction to unlatch said spider with respect to said turret, means for turning the unlatched spider to move the spoons thereof out of alignment with respect to said baskets whereby the tenpins therein drop to said deck, blocking means located to confront said interlock probe means when said chute is indexed under said conveyor means for receiving a tenpin, said blocking means being responsive to said deck occupying its second position after setting a new set of tenpins on the alley floor whereby said blocking means clears said interlock probe means for positive movement to effect unlatching of said spider with respect to said turret to release the tenpins in said turret to said deck, means operatively associated with said spider for actuating said trip lever means after unlatching of said spider whereby said chute is indexed away from its position under said conveyor means, pin gate means operably associated with said conveyor means for blocking the feed of tenpins to said turret and conditionally operable in response to said stop lever follower entering an index dwell for permitting the feed of a tenpin to a correlated one of said turret baskets and chute, the combination comprising, means for selectively controlling operation of said pin gate means to prevent the feed of a tenpin to preselected ones of said turret baskets and also for controlling operation of said stop lever follower for regulating turret movement to index each basket denied a tenpin away from the pin receiving position under the conveyor, solenoid means for selectively controlling operation of said gate means to prevent the release of a tenpin to said chute, a spider release link controlled by said solenoid means for engaging said interlock probe means when said interlock probe means moves alongside of said blocking means as said chute indexes under said conveyor means, said spider release link being responsive to actuation of said solenoid means by undergoing motion in a direction to engage said interlock probe means to actuate same in a direction for unlatching said spider with respect to said turret without a tenpin being fed to said chute, means including first switch means responsive to turret turning and second switch means responsive to the position of said deck for actuating said solenoid means to block the feed of a tenpin to said chute and to effect release of tenpins from said turret to said deck when said chute and deck are in their respective pin receiving positions.

3. A tenpin bowling machine for providing automatic spare play practice wherein any one or more of the ten tenpins are delivered by said machine to the alley floor comprising, a movable deck for spotting tenpins on an alley floor, a rotatable turret having nine baskets and a chute each for individually receiving a tenpin, conveyor means for feeding tenpins to said turret, a pin gate operatively responsive to turret turning and associated with said conveyor means for releasing tenpins to said turret and for blocking the feed of tenpins to said turret, means for turning said turret whereby said baskets and chute are individually indexed and latched under said conveyor means for receiving a tenpin, means for selectively controlling said pin gate and also turret indexing wherein only selective ones of said baskets are indexed and latched under said conveyor means for receiving tenpins for spare practice play, a pin gate operator for preventing the feed of a tenpin to said chute, solenoid means for selectively controlling said pin gate operator, means for conditioning said solenoid means for selectively blocking the feed of a tenpin to said chute as said chute indexes under said conveyor, spider release means operatively associated with said turret for releasing the tenpins stored therein to said deck when said chute is under said conveyor means and then indexing said chute away from under said conveyor means, said spider release means normally being actuated by a tenpin fed to said chute, and means for actuating said spider release means upon said chute being denied a tenpin.

4. Apparatus as defined in claim 3 further including, means for actuating said bowling machine to set a desired set of tenpins constituting spare play practice after each time a ball is rolled.

5. In a tenpin bowling machine for providing automatic spare play practice wherein any one or more of ten tenpins are delivered by said machine to the alley floor and wherein said machine includes a movable deck for spotting tenpins on the alley floor, a rotatable turret having nine baskets and a chute each for individually receiving a tenpin, conveyor means for feeding tenpins to said turret, a pin gate operatively associated with said conveyor means for releasing tenpins to said turret and for blocking the feed of tenpins to said turret, means for turning said turret whereby said baskets and chute individually index under said conveyor means for receiving a tenpin, spider release means operatively associated with said turret for releasing the tenpins therein to said deck after said chute indexes under said conveyor means and then indexing said chute away from said conveyor means, said spider release means normally being actuated by a tenpin fed to said chute, the combination comprising, a source of voltage, a rotary switch having ten wiper contacts and an operatively associated wiper arm, said arm being connected to said source, said arm turning with said turret to contact individual ones of said wiper contacts in correlation with turret indexing as individual ones of said baskets and said chute index under said conveyor means, first solenoid means, a plurality of switch means individually in series with said wiper contacts for selectively completing the electrical connection between said individual wiper contacts and said solenoid, a pin gate solenoid link responsive to energization of said solenoid means for regulating said pin gate to prevent the feed of a tenpin to said turret and to a respective one of said baskets and chute when the correlated wiper contact is in contact with said wiper arm and said solenoid is energized, a second rotary switch having at least nine wiper contacts individually correlated with indexing of each basket under said conveyor means and also having an operatively associated wiper arm, said arm turning with said turret and being connected to said source, second solenoid means, a plurality of switch means individually in series with said wiper contacts of said second switch for selectively completing the electrical connection of such contacts with said second solenoid means whereby said second solenoid means may be selectively energized with respect to a given one or more of said turret baskets, indexing trip lever means operated by said second solenoid for causing a basket to by-pass said conveyor means because the wiper contact corresponding to said basket and in said second rotary switch contacts its wiper arm to energize said second solenoid, and means including additional switch means selectively responsive to indexing of said chute under said conveyor means for actuating said spider release means without a pin being fed to said chute, whereby any one or more of ten tenpins may be fed from said turret to said deck upon selectively opening and closing correlated switch means.

6. In a tenpin bowling machine for providing automatic spare play practice wherein any one or more of ten tenpins are delivered by said machine to the alley floor and wherein said machine includes a movable deck for spotting tenpins on the alley floor, a rotatable turret having nine baskets and a chute each for individually receiving a tenpin, conveyor means for feeding tenpins to said turret, a pin gate operatively associated with said conveyor means for releasing tenpins to said turret and for blocking the feed of tenpins to said turret, means for turning said turret whereby said baskets and chute individually index under said conveyor means for receiving a tenpin, spider release means operatively associated with said turret for releasing the tenpins therein to said deck after said chute indexes under said conveyor means and then indexing said chute away from said conveyor means, said spider release means normally being actuated by a tenpin fed to said chute, the combination comprising, means for selectively controlling turret indexing whereby only selected ones of said baskets are indexed under said conveyor means for receiving tenpins for spare practice play, means for controlling said pin gate for releasing a tenpin to said selected baskets and to said chute, and means selectively responsive to indexing of said chute under said conveyor means for actuating said spider release means without a pin being fed to said chute, whereby any one or more of selected tenpins may be fed from said turret to said deck.

7. Apparatus as defined in claim 6 wherein said last-mentioned means comprises a split link spider release operator, a source of voltage, and a solenoid, said split link including a pair of outer links connected to said solenoid for positive movement in a direction to actuate said spider upon energization of said solenoid, a third link supported between said pair of links, a fixed reference having a pin member, the three links having longitudinal slots through which said pin member passes crosswise, said third link having a second slot, a second pin member carried between said outer links and passing through said second slot, a spring connecting said third link to said outer links for causing said middle link to follow the positive movement of said outer links, and a return spring connected from said fixed reference to said outer links for returning said outer links to a neutral position upon de-energizing said solenoid, said third link following said outer links to neutral position upon said second pin engaging an edge of said second slot, and said third link having means for actuating the spider release means upon undergoing positive movement.

8. A bowling pin machine comprising, a rotatable turret having a plurality of tenpin baskets to receive individual tenpins, a conveyor having a tenpin releasing position for releasing tenpins passing along said conveyor to individual ones of said turret baskets when the turret basket is at said pin releasing position, means mounting said turret for rotation about an upright axis to move each turret basket successively to the pin releasing position, means moving with said turret during one phase of operation for holding tenpins in said baskets, said last-mentioned means being equipped to move relative to said turret during another phase of operation to release tenpins from said turret baskets, operable means normally responsive to the release of a tenpin from said conveyor to a turret basket for indexing said turret to advance the next turret basket to said pin releasing position, means having alternate phases of operation and operatively associated with said conveyor for blocking the passage of a tenpin along said conveyor during one phase of operation and for permitting the passage of a tenpin along said conveyor for release to a turret basket during another phase of operation, and regulating means for selectively controlling the last-two-recited means to index preselected ones of said turret baskets past said pin releasing position without stopping thereat and also preventing delivery of a tenpin from said conveyor to said preselected turret baskets, whereby said turret is equipped to contain a quantity of tenpins less than the total number of turret baskets.

9. A bowling pin machine comprising, a rotatable turret having a plurality of outer tenpin baskets and an inner basket to receive individual tenpins, a conveyor having a tenpin releasing position for releasing tenpins passing therealong to the individual ones of said turret baskets when the turret basket is at said pin releasing position, means mounting said turret for rotation about an upright axis to move each turret basket successively to the pin releasing position, means moving with said turret during one phase of operation for holding tenpins in said outer baskets, said last-mentioned means being equipped to move relative to said turret during another phase of operation to release tenpins from said outer turret baskets, first operable means for selectively releasing a tenpin from said inner basket and for regulating said last-mentioned means to cause same to move relative to said turret, second operable means normally responsive to the release of a tenpin from said conveyor to a turret basket for indexing said turret to advance the next turret basket to said pin releasing position, gate means having alternate phases of operation and operatively associated with said conveyor for blocking the passage of a tenpin along said conveyor during one phase of operation and for permitting the passage of a tenpin along said conveyor for release to a turret basket during a second phase of operation, and regulating means for selectively controlling the last-two-recited means to index preselected ones of said outer turret baskets past said pin releasing position without stopping thereat and also preventing delivery of a tenpin from said conveyor to said preselected outer turret baskets, whereby said turret is equipped to contain a quantity of tenpins less than the number of turret baskets.

10. Apparatus as defined in claim 9, said mounting means including an indexing cam having a plurality of indexing cam dwells individually corresponding to respective ones of said baskets, said regulating means including third operable means for engaging the individual cam dwells successively for individually holding each corresponding turret basket at a tenpin releasing position and being conditionable to withdraw from an engaged dwell in response to actuation of said second operable means by a pin released to such corresponding basket, whereby said turret is equipped to index the next basket towards said tenpin releasing position, said third operable means also being equipped to regulate said gate means for converting same from its blocking phase of operation to its second phase of operation, and said regulating means also including individual members for blocking the cam dwells corresponding to the preselected ones of said outer turret baskets.

11. A bowling pin handling apparatus comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, means movable with the turret for supporting pins in said plurality of pockets and movable relative to the turret to release the pins to drop below the turret, a conveyor having a discharge end disposed to deliver pins successively to the turret pockets at the pin receiving station, means responsive to the passage of a pin from said conveyor to each of said plurality of pockets at the pin receiving station for indexing the turret to advance the next pocket to the pin receiving station, means responsive to the passage of a pin from said conveyor to said other pocket at the pin receiving station for moving the supporting means relative to the turret and for indexing the turret to advance the first of said plurality of pockets to the pin receiving station, means normally blocking the passage of pins on the conveyor and conditionable in response to turret indexing to permit the passage of a pin to the turret, and selectively operable means for controlling the last three recited means to index any preselected pockets past the pin receiving station while preventing delivery of pins from the conveyor to said preselected pockets and to move said supporting means relative to the turret when one of said preselected pockets is said other pocket.

12. In a bowling alley machine including turret means having a plurality of storage bins for individually receiving a tenpin and for releasing the stored tenpins for setting on a bowling alley floor, second means for feeding a tenpin to each turret bin, third means, for mounting said turret for rotation to move each turret bin successively to a pin receiving position with respect to said second means, fourth means responsive to the release of a tenpin to a turret bin for indexing said turret to advance the next turret bin to said pin receiving position, pin gate means alternately operable for permitting the release of tenpins from said second means to said turret bins for one phase of pin gate operation and for blocking the feed of tenpins to said turret bins during a second phase of pin gate operation, fifth means for regulating operation of said pin gate means to effect the release of a tenpin to each turret bin as the individual bins arrive at said pin receiving position, the combination comprising, electrical solenoid means for selectively controlling said fifth means for blocking feed of a tenpin to one of said bins, said one bin being the storage bin last to index under said pin receiving station for each cycle of turret rotation, and means including switch means responsive to turret turning for selectively actuating said solenoid means for preventing the feed of a tenpin to said one bin, whereby said turret means may have a quantity of stored tenpins less than the number of bins for release to the bowling alley floor.

13. In the combination as defined in claim 12, said one storage bin including sixth means for effecting the release of stored tenpins from said turret bins in response to said one bin receiving a tenpin and then conditioning said fourth means to index said one bin away from said pin receiving position, said solenoid means also being conditioned by said switch means to actuate said sixth means for effecting release of tenpins stored in said turret bins when said one bin is selectively denied a tenpin and for conditioning said fourth means to cause said one bin to index away from said pin receiving position.

14. In the combination as defined in claim 13, said solenoid means including first and second solenoids, the first of said solenoids being equipped to control said fifth means for controlling pin gate operation, the second of said solenoids being equipped to actuate said sixth means for controlling release of stored tenpins from said turret and for indexing said turret to cause said one bin to move away from said pin receiving position, said switch means being conditioned in response to turret turning for regulating said first and second solenoids in timed relationship to effect pin gate blocking prior to arrival of said one bin in pin receiving position and to effect actuation of said sixth means when said one bin is in the pin receiving position.

15. A bowling alley machine including turret means having a plurality of storage bins for individually receiving a tenpin and for releasing the stored tenpins for setting on a bowling alley floor, second means for feeding a tenpin to each turret bin, third means for mounting said turret for rotation to move each turret bin successively to a pin receiving position with respect to said second means, fourth means responsive to release of a tenpin to a turret bin for indexing said turret to advance the next turret bin to said pin receiving position, pin gate means operatively associated with said second means for blocking the feed of tenpins to said turret bins and conditionally operable in response to turret turning for permitting the feed of a tenpin to each turret bin, the combination comprising, electrical solenoid means for selectively controlling said pin gate means for blocking the feed of a tenpin to one of said bins, said one bin being the storage bin last to index under said pin receiving station for each cycle of turret rotation, and means including switch means responsive to turret turning for selectively actuating said solenoid means for preventing the feed of a tenpin to said one bin, whereby said turret means may have a quantity of stored tenpins less than the number of bins for release to the bowling alley floor.

16. In the combination as defined in claim 15, said one storage bin including fifth means for effecting the release of stored tenpins from said turret bins in response to one bin receiving a tenpin and then conditioning said fourth means to index said one bin away from said pin receiving position, said solenoid means also being conditioned by said switch means to actuate said fifth means for effecting the release of stored tenpins from said turret when said one bin is selectively denied a tenpin, and for conditioning said fourth means to cause said one bin to index away from said pin receiving position.

17. In a combination as defined in claim 16, said solenoid means including first and second solenoids, the first of said solenoids being equipped to control operation of said pin gate means for selectively blocking the feed of a tenpin to said one bin, and the second of said solenoids being equipped to actuate said fifth means for controlling release of stored tenpins from said turret and for indexing said one bin away from said pin receiving position.

18. A bowling alley machine comprising, turret means having a plurality of storage bins for individually receiving a tenpin and for releasing the stored tenpins for setting same on a bowling alley floor, second means for feeding a tenpin to each turret bin, third means for mounting said turret for rotation to move each turret bin successively to a pin receiving position with respect to said second means, fourth means for latching said turret against turning and responsive to the release of a tenpin to said turret bins for indexing said turret to advance the next turret bin to said pin receiving position, pin gate means operably associated with said second means for blocking the feed of tenpins to said turret bins and conditionally operable in response to turret turning for permitting the feed of tenpins individually to each turret bin, fifth means for selectively controlling operation of said pin gate means to prevent the feed of a tenpin to preselected ones of said turret bins and also for controlling operation of said fourth means for regulating turret movement to index each bin denied a tenpin away from the pin receiving position, and sixth means for effecting the release of stored tenpins from said turret.

19. In a bowling alley machine including turret means having a plurality of storage bins of a first class and one storage bin of a second class for individually receiving a tenpin and for releasing the stored tenpins for setting on a bowling alley floor, second means for feeding a tenpin to each turret bin, third means for mounting said turret for rotation to move each turret bin successively to a pin receiving position with respect to said second means, fourth means responsive to the release of a tenpin to a turret bin for indexing said turret to advance the next turret bin to said pin receiving position, pin gate means operable with said second means for blocking the feed of tenpins to said turret bins and conditionally operable in response to turret turning for permitting the feed of tenpins individually to said turret bins, the combination comprising, fifth means for selectively controlling operation of said pin gate means to prevent the feed of a tenpin to preselected ones of said first class bins and also for controlling operation of said fourth means for regulating turret movement to index each first class bin denied a tenpin away from the pin receiving position, electrical solenoid means for selectively controlling said pin gate means for blocking the feed of a tenpin to said second class bin, and means including switch means responsive to turret turning for selectively actuating said solenoid means for preventing the feed of a tenpin to said second class bin, and seventh means for effecting the release of stored tenpins from said turret.

20. A combination as defined in claim 19, said seventh means being operably associated with said second class bin for effecting release of tenpins stored in said turret bins in response to said second class bin receiving a tenpin and then operably conditioning said fourth means to index said second class bin away from said pin receiving position, said solenoid means also being conditioned by said switch means to actuate said seventh means for effecting the release of tenpins stored in said turret bins when said second class bin is selectively denied a tenpin and for rotating said turret to index said second class bin away from said pin receiving position.

21. A combination as defined in claim 20, said solenoid means including first and second solenoids, the first of said solenoids being equipped to actuate said pin gate means for selectively controlling operation thereof for blocking the release of a tenpin to said second class bin. the second of said solenoids being equipped to actuate said seventh means for controlling the release of tenpins from said turret and for indexing said second class bin away from said pin receiving position, said switch means being conditioned in response to turret turning to regulate said solenoids in timed relationship to effect pin gate blocking prior to arrival of said second class bin in pin receiving position, and to effect actuation of said seventh means when said second class bin is in the pin receiving position.

22. A combination as defined in claim 21 further including an index cam turnable with said turret and having a plurality of dwells each corresponding to an individual one of said turret bins, an index cam follower for engaging each dwell successively as the turret turns for regulating said pin gate means, said fourth means being coupled to said follower to condition said follower to lift from a dwell in response to a tenpin being released to the turret bin corresponding to the aforesaid dwell, lifting of said follower from a dwell allowing said turret to index to advance the next bin to said pin receiving position, said turret being latched against rotation for indexing the next bin to the pin receiving position while said follower occupies a dwell, entry of said follower into a dwell actuating said pin gate means to release an individual tenpin to the turret bin corresponding to said dwell entered by said follower, said fifth means including a plurality of block members for individual insertion into each dwell corresponding to the preselected bins of said first class to be denied tenpins, said follower being denied entry into each blocked dwell corresponding to such preselected bins thereby preventing the release of a tenpin to said preselected bins and also causing indexing of said preselected bins past said pin receiving position.

23. A combination as defined in claim 1 wherein said selectively controlling means comprises individual block members for selective insertion in index dwells corresponding to the preselected turret baskets to deny entry of said stop lever follower in each dwell occupied by a block member, whereby said preselected baskets are indexed past said conveyor without a tenpin.

24. Apparatus as defined in claim 3, wherein said solenoid means and said last-mentioned means for actuating said spider release means include first and second solenoids, respectively, said first solenoid being linked to said pin gate operator, said last-mentioned means for actuating said spider release means further including a spider release link conditioned by said second solenoid for engaging said spider release means when said chute is indexed under said conveyor means, means including first switch means responsive to the position of said deck for actuating said second solenoid in response to said deck being in the position to receive the tenpins in said turret, whereby tenpins in said turret are fed to said deck and said chute indexes away from said conveyor means without a tenpin dropping in said chute.

25. A bowling pin handling apparatus comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, and selectively operable means for controlling the last two recited means to index any selected pocket past the pin receiving station while preventing delivery of a pin from the conveyor to said selected pocket.

26. A bowling pin handling apparatus comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, means responsive to the passage of a pin from said conveyor to each of said plurality of pockets at the pin receiving station for indexing the turret to advance the next pocket to the pin receiving station, means responsive to the passage of a pin from said conveyor to said other pocket at the pin receiving station for indexing the turret to advance the first of said plurality of pockets to the pin receiving station, means normally blocking the passage of pins on the conveyor and conditionable in response to turret indexing to permit the passage of a pin from the conveyor to the turret, and selectively operable means for controlling the last three recited means to index any preselected pockets past the pin receiving station while preventing delivery of pins from the conveyor to said preselected pockets.

27. A bowling pin handling apparatus comprising, a turret indexable about an upright axis and having a plurality of pin receiving pockets arranged in predetermined positions relative to the axis to move successively past a pin receiving station, means movable with the turret for supporting pins in the pockets and movable relative to the turret to release the pins to drop below the turret, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, means responsive to the passage of a pin to the last pocket on the turret for moving the pin supporting means relative to the turret to release the pins, and selectively operable means for controlling the last three recited means to index any preselected pocket past the pin receiving station while preventing delivery of a pin from the conveyor to said preselected pocket and to move said supporting means relative to the turret to release the pins when said preselected pocket is said last pocket.

28. A bowling pin handling apparatus comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, means movable with the turret for supporting pins in said plurality of pockets and movable relative to the turret to release the pins to drop below the turret, a conveyor having a discharge end disposed to deliver pins successively to the turret pockets at the pin receiving station, means responsive to the passage of a pin from said conveyor to each of said plurality of pockets at the pin receiving station for indexing the turret to advance the next pocket to the pin receiving station, means responsive to the passage of a pin from said conveyor to said other pocket at the pin receiving station for moving the supporting means relative to the turret and for indexing the turret to advance the first of said plurality of pockets to the pin receiving station, means normally blocking the passage of pins on the conveyor and conditionable in response to turret indexing to permit the passage of a pin to the turret, and means for controlling the last three recited means to index any preselected pockets past the pin receiving station while preventing delivery of pins from the conveyor to said preselected pockets and to move said supporting means relative to the turret when one of said preselected pockets is said other pocket.

29. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a spider having arms for supporting pins in said plurality of pockets, latch means normally latching the spider to the turret for movement therewith, spring loaded drive means for rotating the spider relative to the turret when the latch means is released thereby to release the pins, a continuously moving conveyor having a discharge end disposed to deliver pins successively to the turret pockets at the pin receiving station, means continuously tending to index the turret, latch means normally preventing turret indexing, first trip means responsive to the passage of a pin from said conveyor to each of said plurality of pockets at the pin receiving station for releasing the turret latch means to advance the next pocket to the pin receiving station, second trip means responsive to the passage of a pin from said conveyor to said other pocket at the pin receiving station for releasing the spider latch means and the turret latch means to thereby release the pins and index the turret, a pin gate for blocking the passage of pins on the conveyor, latch means normally locking the pin gate in blocking position, third trip means responsive to turret indexing for releasing the gate latch means to permit the passage of a pin to the turret, and selectively operable means for controlling the three trip means to index any preselected pockets past the pin receiving station while preventing the delivery of pins from the conveyor to said preselected pockets and to drop the pins when one of said preselected pockets is said other pocket.

30. A bowling pin handling apparatus comprising, a turret indexable about an upright axis and having a plurality of pin receiving pockets arranged in predetermined positions relative to the axis to move successively past a pin receiving station, conveyor means having a discharge end disposed to deliver pins successively to the turret pockets at the pin receiving station, means responsive to the passage of pins to the turret for operating the conveyor means and the turret automatically in timed relation to alternately deliver a pin from the conveyor means to a turret pocket at the pin receiving station and then index the turret to position the next pocket at the pin receiving station, thereby to fill all turret pockets, and selectively operable means for controlling the last recited means to automatically index any selected pocket past the pin receiving station while preventing delivery of a pin from the conveyor to said selected pocket.

31. A bowling pin handling apparatus comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, and means for controlling the first recited means to index any selected pocket past the pin receiving station while controlling the second recited means to prevent delivery of a pin from the conveyor to said selected pocket.

32. A bowling pin handling apparatus comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, first means responsive to the passage of a pin from said conveyor to each of said plurality of pockets at the pin receiving station for indexing the turret to advance the next pocket to the pin receiving station, second means responsive to the passage of a pin from said conveyor to said other pocket at the pin receiving station for indexing the turret to advance the first of said plurality of pockets to the pin receiving station, third means normally blocking the passage of pins on the conveyor and conditionable in response to turret indexing to permit the passage of a pin to the turret, first selectively operable means for controlling the first and third responsive means to index any selected pocket of said plurality of pockets past the pin receiving station while preventing delivery of a pin from the conveyor to said selected pocket, and second selectively operable means for controlling the second and third responsive means to index said other pocket past the pin receiving station while preventing delivery of a pin thereto.

33. A bowling pin handling apparatus comprising, an indexable receiver having a plurality of pin receiving pockets arranged in predetermined positions for movement successively past a pin receiving station, a conveyor having a discharge end disposed to deliver pins successively to the receiver pockets at the pin receiving station, means normally operative to block the passage of pins on the conveyor and conditionable in response to receiver indexing for passing a pin to the receiver, means responsive to the passage of each pin from the conveyor to a pin receiving pocket at the pin receiving station for indexing the receiver to advance the next pocket to the pin receiving station, selectively operable means for controlling the first recited means to prevent delivery of a pin from the conveyor to any receiver pocket, means operable in timed relationship with the selectively operable means for controlling the second recited means to index any receiver pocket past the pin receiving station without receiving a pin, and manually selectively controllable means for controlling the last two recited means to prevent delivery of a pin to a selected pocket and index said selected pocket past the receiving station.

34. A bowling pin handling apparatus, comprising, an indexable receiver having a plurality of pin receiving pockets arranged in predetermined positions for movement successively past a pin receiving station for each cycle of receiver movement, a conveyor having a discharge end disposed to deliver pins successively to the receiver pockets at the pin receiving station, means normally operative to block the passage of pins on the conveyor and conditionable in response to receiver indexing to permit the passage of a pin to the receiver, means responsive to the passage of each pin from the conveyor to a pin receiving pocket at the pin receiving station for indexing the receiver to advance the next pocket to the pin receiving station, means for controlling the first recited means to prevent delivery of a pin from the conveyor to the pocket last to index past said receiving station for each cycle of receiver movement, and means for controlling the second recited means to index said last pocket past the pin receiving station when said last pocket is denied a pin.

35. A bowling pin handling apparatus comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, first control means normally blocking the passage of pins on the conveyor and conditionable in response to turret indexing to permit the passage of a pin to the turret, second control means responsive to the passage of a pin from said conveyor to each of said plurality of pockets at the pin receiving station for indexing the turret to advance the next pocket to the pin receiving station, third control means responsive to the passage of a pin from said conveyor to said other pocket at the pin receiving station for indexing the turret to advance the first of said plurality of pockets to the pin receiving station, first means for controlling the first control means to prevent delivery of a pin from the conveyor to any one of said plurality of pockets and also for controlling the second control means to index any of said plurality of pockets past the pin receiving station without receiving a pin, and second means for controlling said third control means to prevent the delivery of a pin from the conveyor to said other pocket and to index said other pocket past the pin receiving station without receiving a pin.

36. A bowling pin handling apparatus for setting a complement of pins for each cycle of operation comprising, means having a plurality of pin receiving pockets arranged in a predetermined position, conveyor means having a discharge end for delivering pins to each of said pockets, means mounting the first-two-recited means for indexing one of said means with respect to the other to condition said conveyor means for releasing a pin to the individual pockets successively, conditionable means cooperating with said conveyor means for feeding pins along said conveyor means for release to said pockets, means for causing all pins received by said pockets to drop from said pockets simultaneously for each cycle of operation, means responsive to the release of a pin from said conveyor means to a pocket for effecting relative indexing wherein the next successive pocket of said plurality is operably positioned relative said conveyor means to receive a pin, and means for controlling said conditionable means to feed a preselected quantity of pins less than a normal complement to said first means for each cycle of operation and for regulating said third means for effecting indexing wherein any preselected empty pocket is denied a pin and the remainder of said pockets receive a pin.

References Cited in the file of this patent

UNITED STATES PATENTS

| | | |
|---|---|---|
| 1,524,241 | Hedenskoog | Jan. 27, 1925 |
| 2,017,143 | Bentz | Oct. 15, 1935 |
| 2,319,925 | Flanagan | May 25, 1943 |
| 2,736,554 | Fluke et al. | Feb. 28, 1956 |
| 2,967,708 | Huck et al. | Jan. 10, 1961 |
| 3,094,327 | Whang et al. | June 18, 1963 |